(12) United States Patent
Rihaczek et al.

(10) Patent No.: US 7,315,276 B1
(45) Date of Patent: Jan. 1, 2008

(54) BEAM COMPRESSION RADAR

(75) Inventors: August W. Rihaczek, Rolling Hills, CA (US); Richard L. Mitchell, Palos Verdes, CA (US)

(73) Assignee: MARK Resources, Inc., Torrance, CA (US)

( * ) Notice: Subject to any disclaimer, the term of this patent is extended or adjusted under 35 U.S.C. 154(b) by 226 days.

(21) Appl. No.: 11/176,549

(22) Filed: Jul. 7, 2005

(51) Int. Cl.
*G01S 13/42* (2006.01)
*H01Q 3/30* (2006.01)

(52) U.S. Cl. .................. 342/157; 342/158; 342/108; 342/372

(58) Field of Classification Search ......... 342/157–158
See application file for complete search history.

(56) References Cited

U.S. PATENT DOCUMENTS

| | | | | |
|---|---|---|---|---|
| 2,852,772 A * | 9/1958 | Gitzendanner | .............. | 342/371 |
| 3,479,494 A * | 11/1969 | Wilmotte | ................... | 708/816 |
| 4,184,154 A * | 1/1980 | Albanese et al. | ........... | 342/107 |
| 4,471,357 A * | 9/1984 | Wu et al. | ................. | 342/25 D |
| 4,989,008 A * | 1/1991 | Fujisaka et al. | .......... | 342/25 F |
| 6,239,747 B1 * | 5/2001 | Kaminski | ................... | 342/442 |
| 6,963,314 B2 * | 11/2005 | Webb et al. | ................. | 343/844 |
| 7,088,956 B2 * | 8/2006 | Kishigami et al. | ............ | 455/65 |
| 2006/0220946 A1 * | 10/2006 | Nohmi | ....................... | 342/107 |

OTHER PUBLICATIONS

R. P. Perry et al., "SAR Imaging of Moving Targets", IEEE Transactions on Aerospace and Electronic Systems, Jan. 1999, pp. 188-199, vol. 35, No. 1.

* cited by examiner

*Primary Examiner*—Thomas H. Tarcza
*Assistant Examiner*—Shelley Chen
(74) *Attorney, Agent, or Firm*—Blakely Sokoloff Taylor & Zafman LLP

(57) ABSTRACT

A concept is described for broadening the beam of a phased array radar antenna to provide continuous illumination of all radar targets within the search space, and this beam is compressed upon reception to realize the angular resolution that is possible with the antenna. The process is analogous to pulse compression. The advantages of the long dwell times provided by this concept include superior clutter suppression performance, more accurate tracking of targets, and the ability to analyze the target returns for reliable discrimination, classification and identification. The broad beam also reduces the power seen by an intercept receiver, for increased covert operation. This is all accomplished without any sacrifice in power. Various embodiments are disclosed.

34 Claims, 19 Drawing Sheets

Cross-Correlation Response
(of single target in this case)

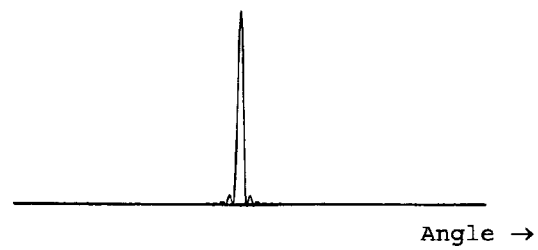
Figure 1a. Conventional Antenna Pattern
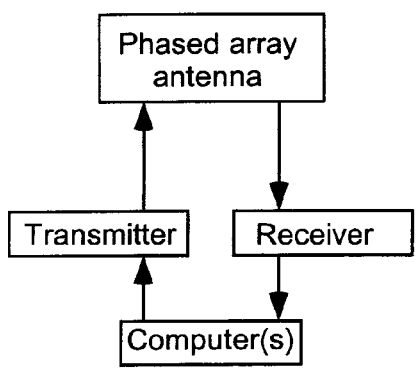
Figure 1b
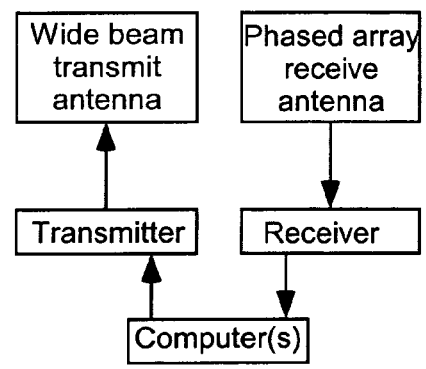
Figure 1c
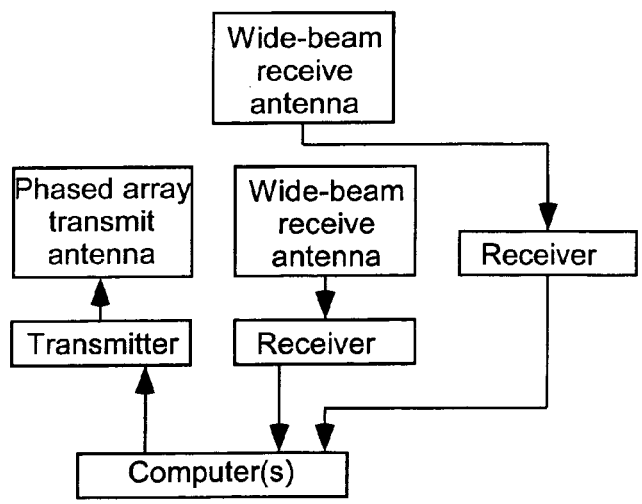
Figure 1d
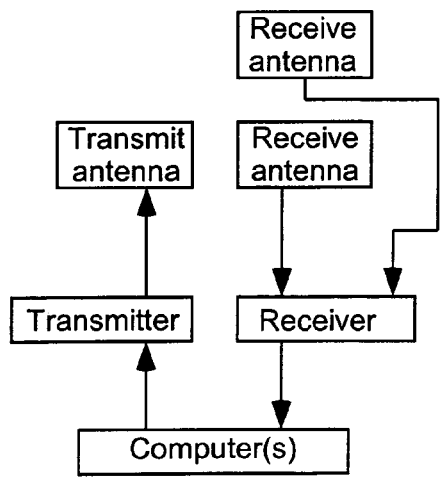
Figure 1e

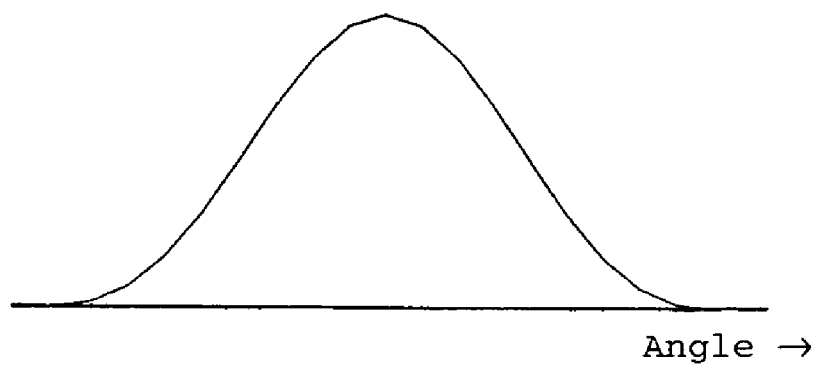
Figure 2. Broad Transmit Beam
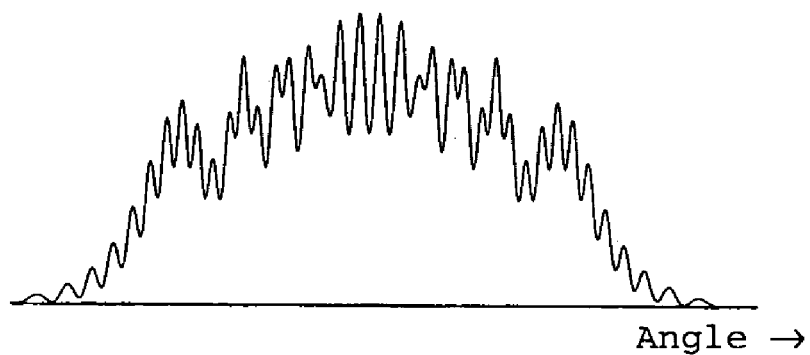
**Figure 3. Receive Pattern of Phased Array
(broadened with nonlinear phase progression)**
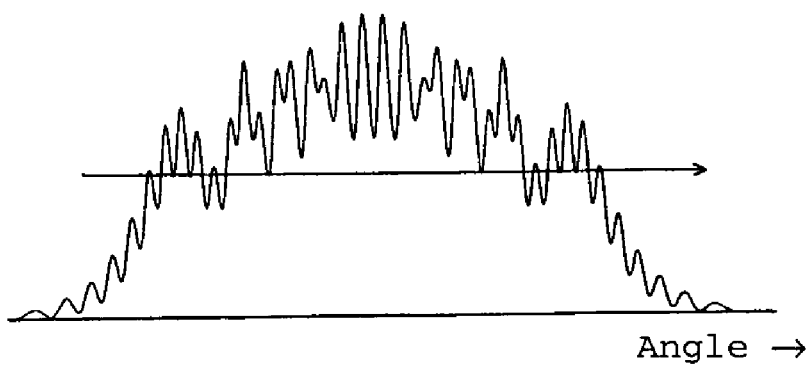
**Figure 4. Scanning of Receive Pattern
Across Target Field to Create Modulated Return(s)**

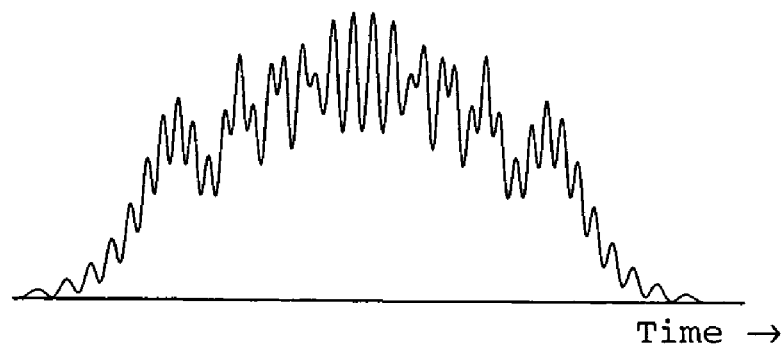
Figure 5. Modulated Signal Returned from Target
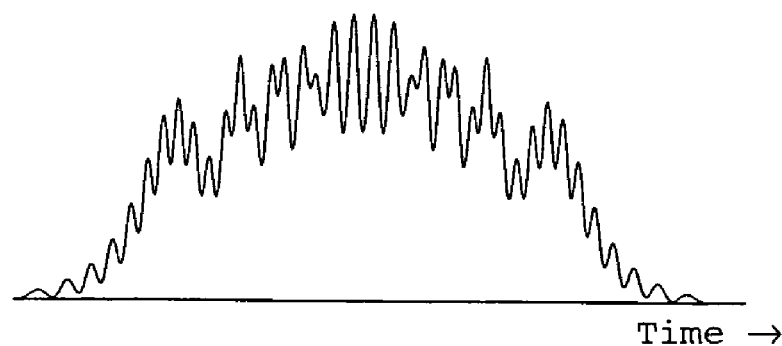
Figure 6. Reference Modulation Signal (stored in receiver)
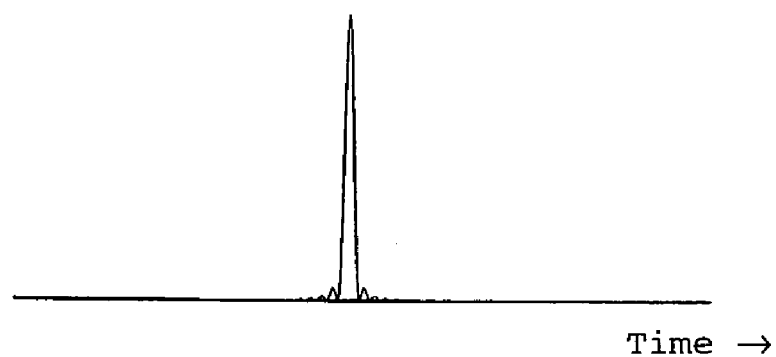
Figure 7. Cross-Correlation Response (of single target in this case)

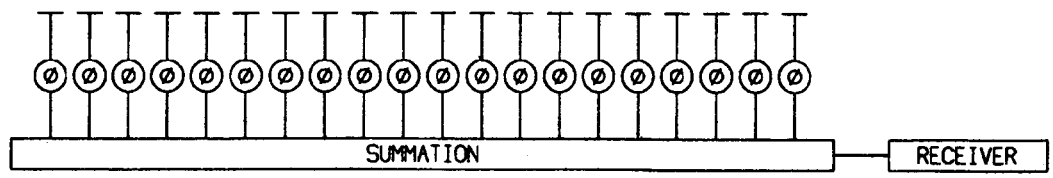
Figure 8. Schematic Diagram for Linear Phased Array
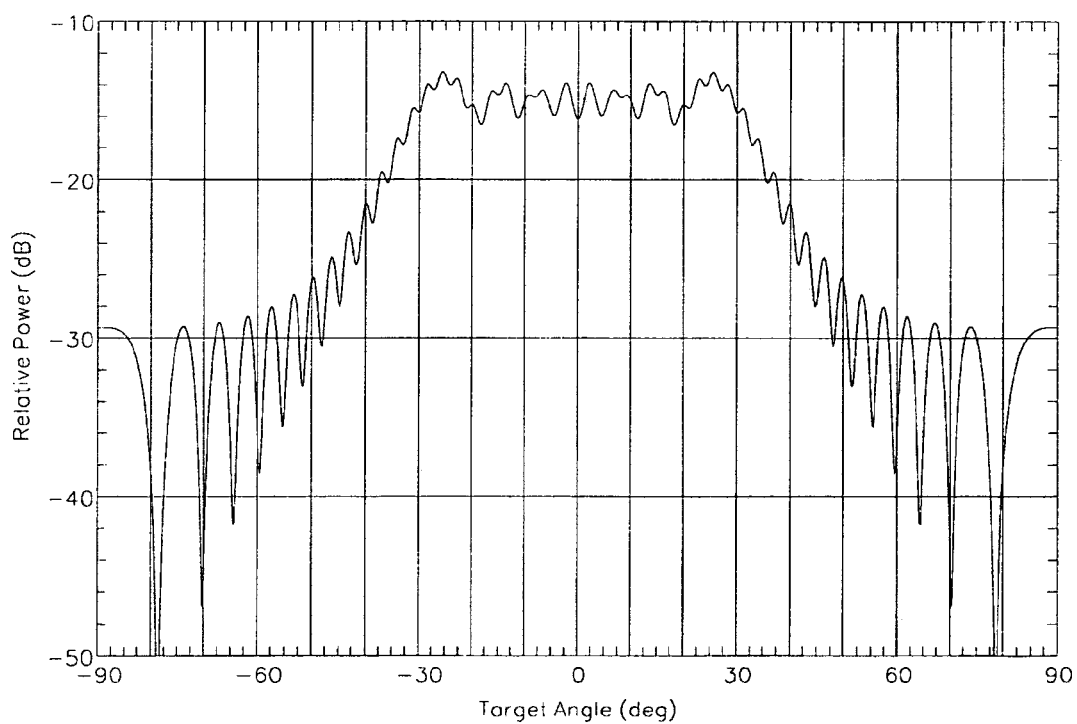
Figure 9. Broadened Beam Pattern with Quadratic Phase (no weighting, a = 0.012,)

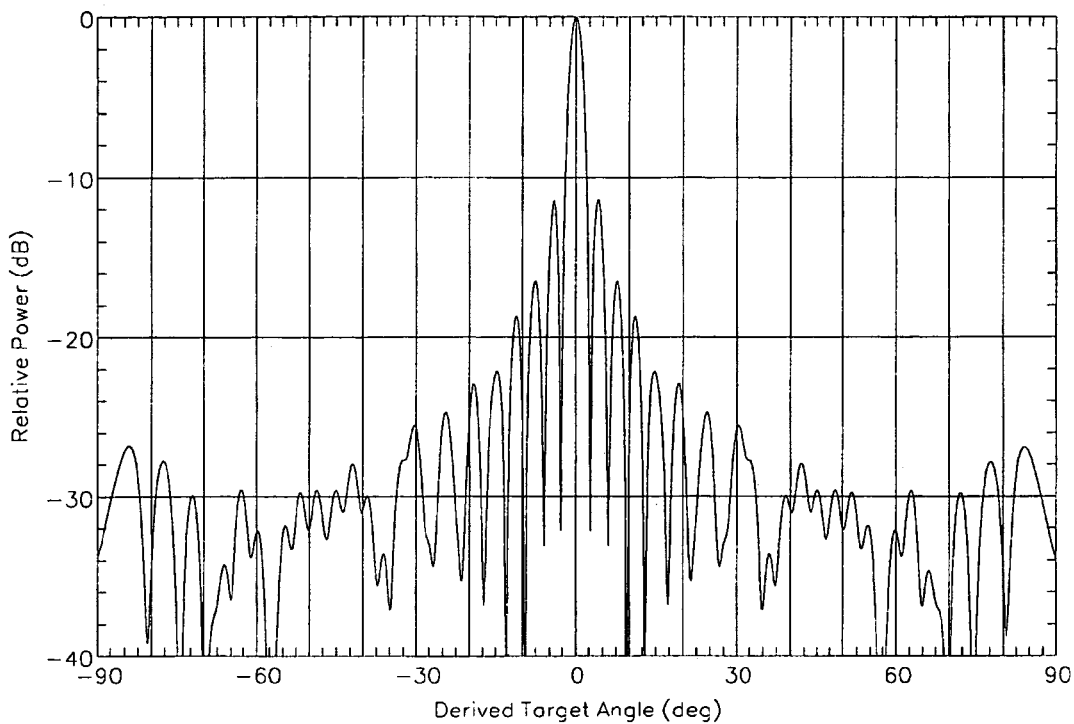
Figure 10. Compressed Beam Pattern for Linear Array
(no weighting, a = 0.012, ±30° scan, target at 0°)
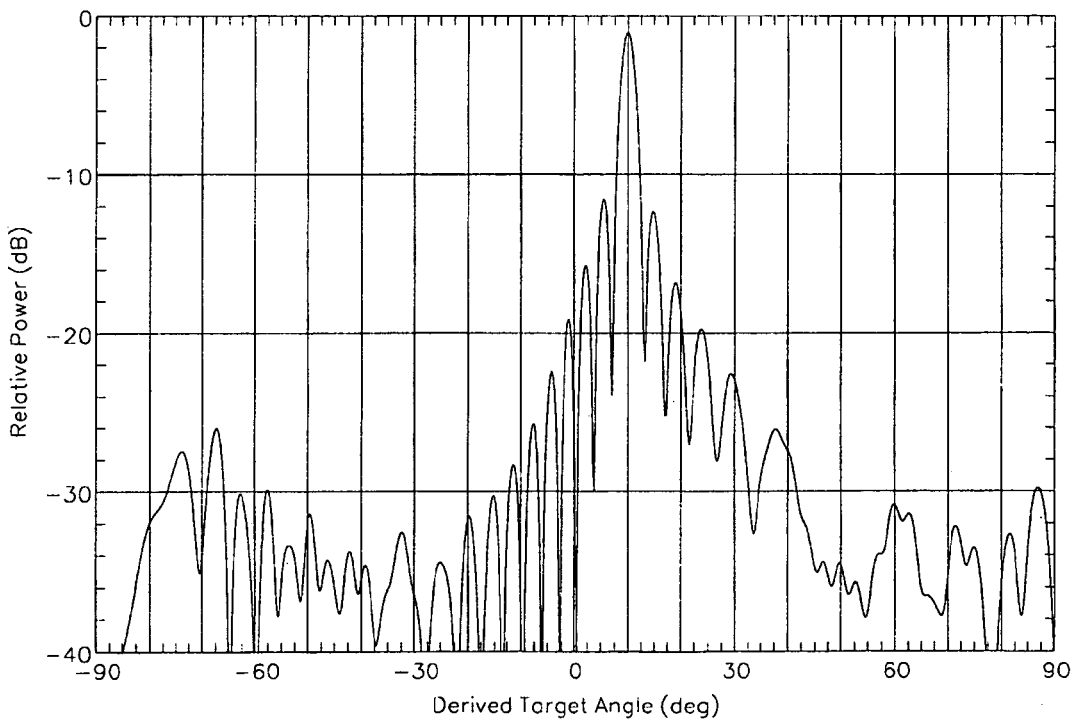
Figure 11. Compressed Beam Pattern for Linear Array
(no weighting, a = 0.012, ±30° scan, target at 10°)

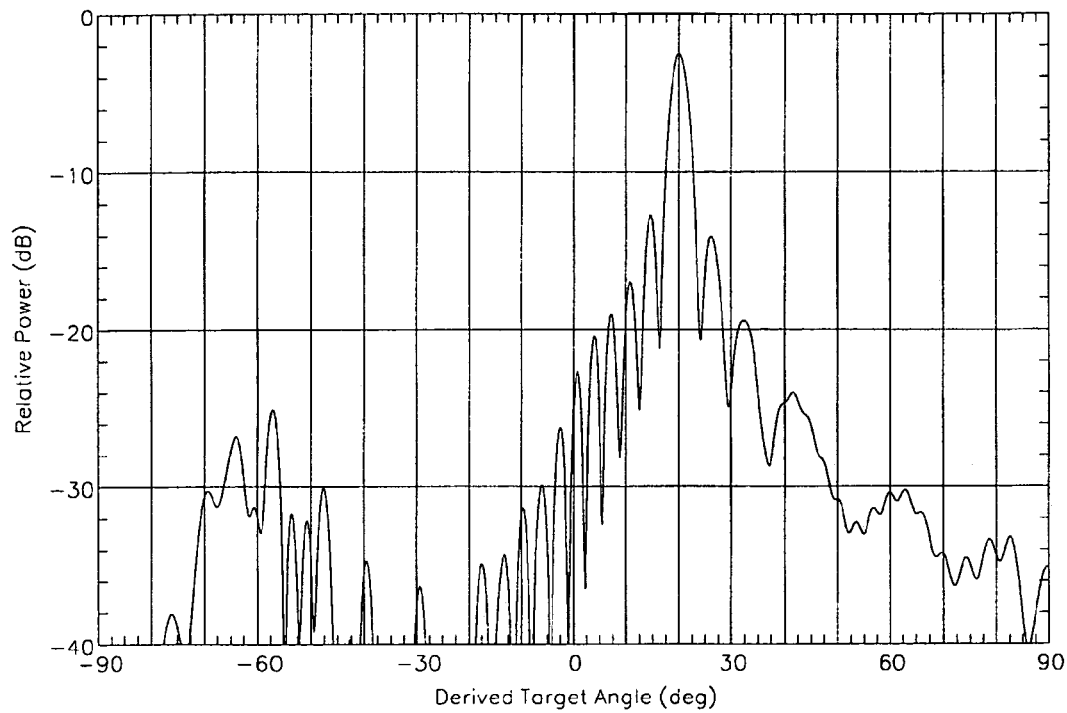
Figure 12. Compressed Beam Pattern for Linear Array
(no weighting, a = 0.012, ±30° scan, target at 20°)
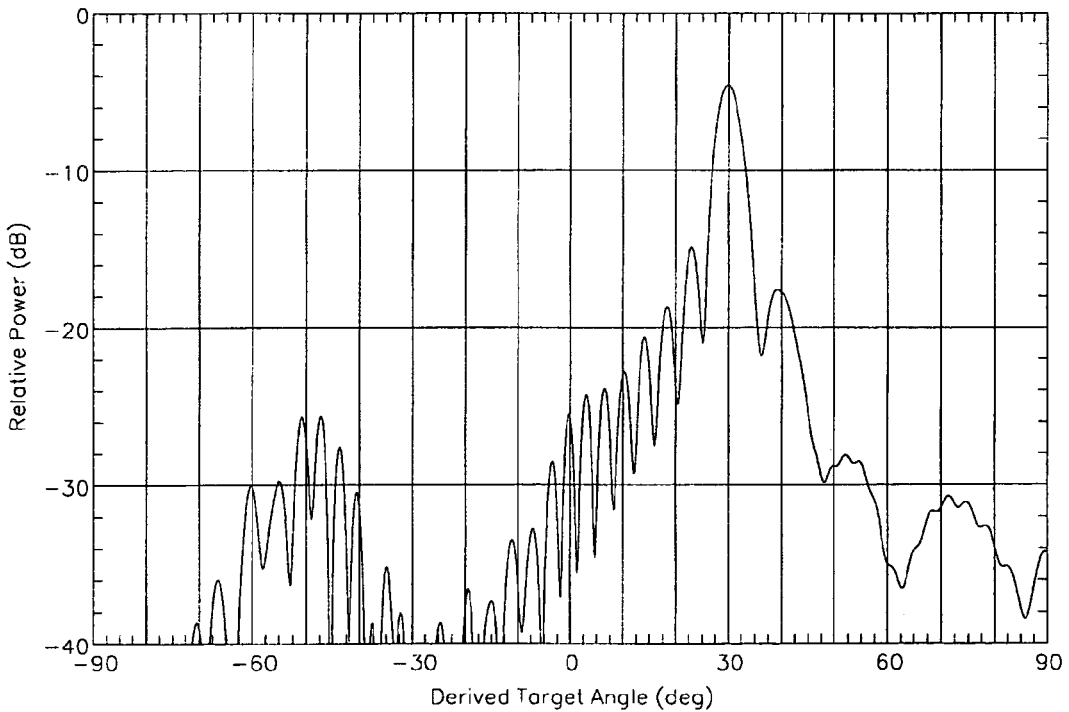
Figure 13. Compressed Beam Pattern for Linear Array
(no weighting, a = 0.012, ±30° scan, target at 30°)

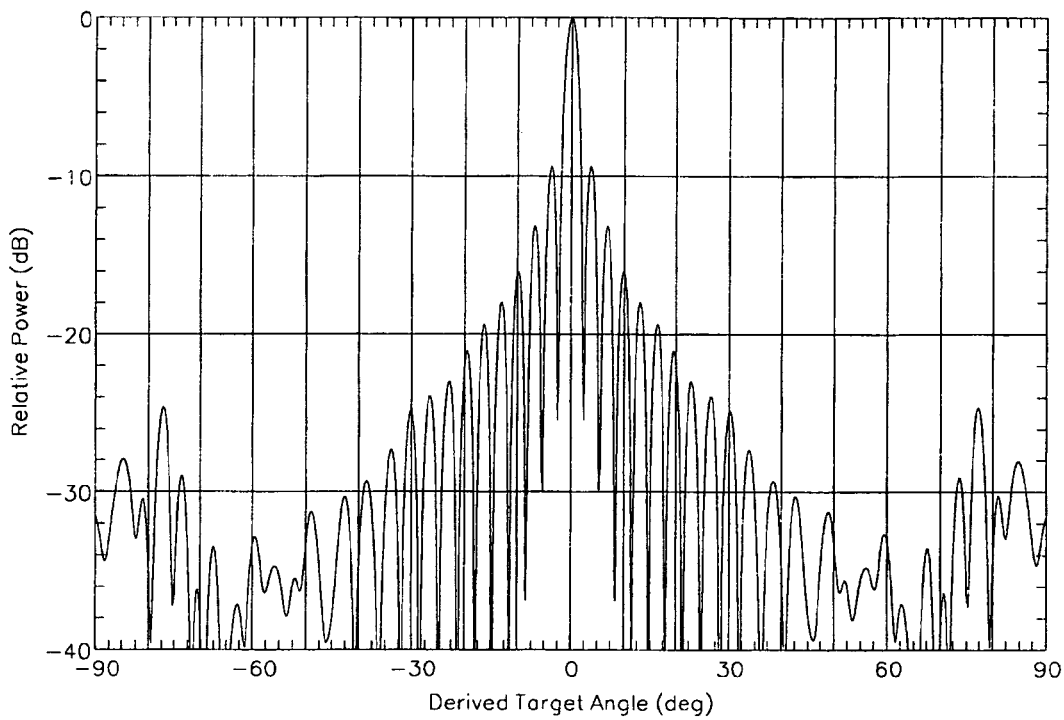
Figure 14. Compressed Beam Pattern for Linear Array
(no weighting, a = 0.012, ±60° scan, target at 0°)
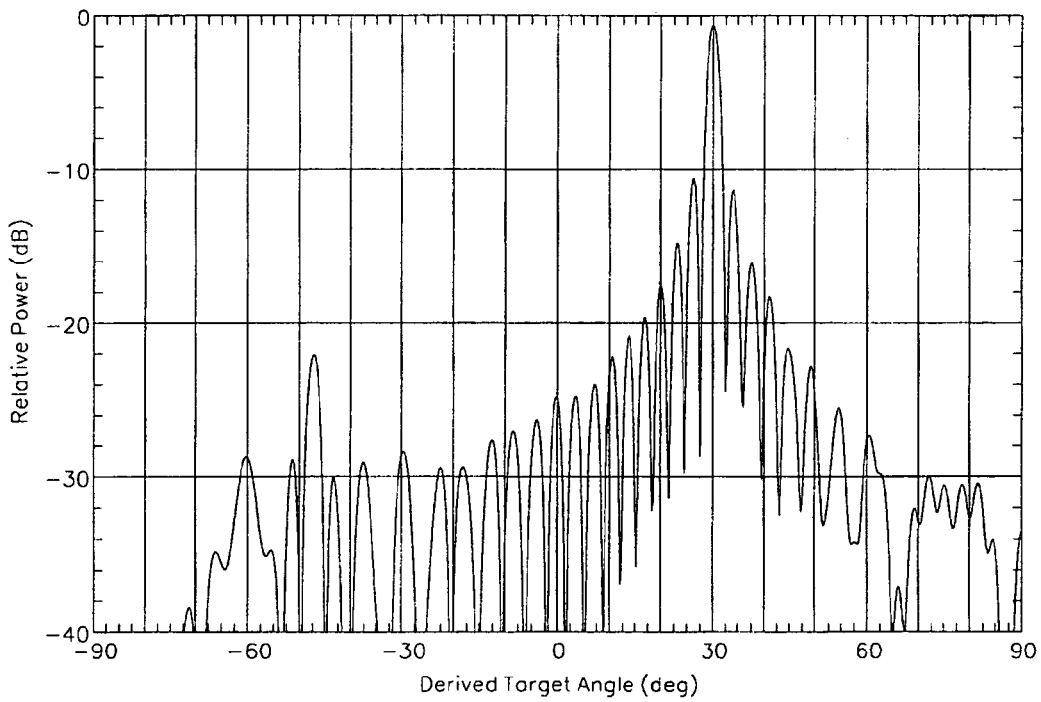
Figure 15. Compressed Beam Pattern for Linear Array
(no weighting, a = 0.012, ±60° scan, target at 30°)

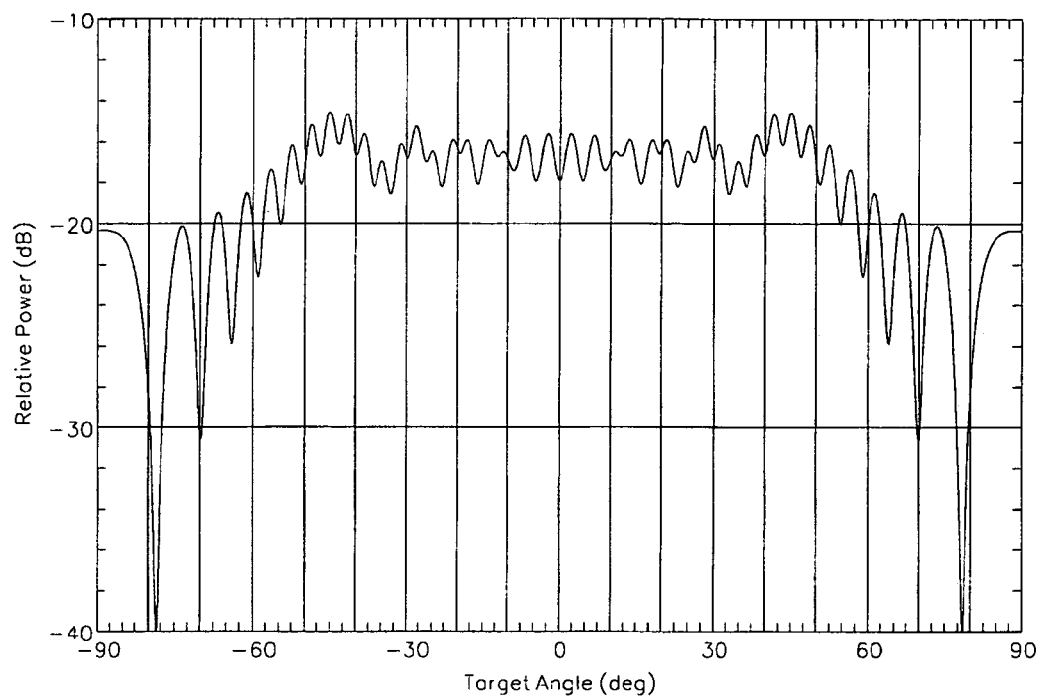
Figure 16. Broadened Beam Pattern for Linear Array
(no weighting, a = 0.018)
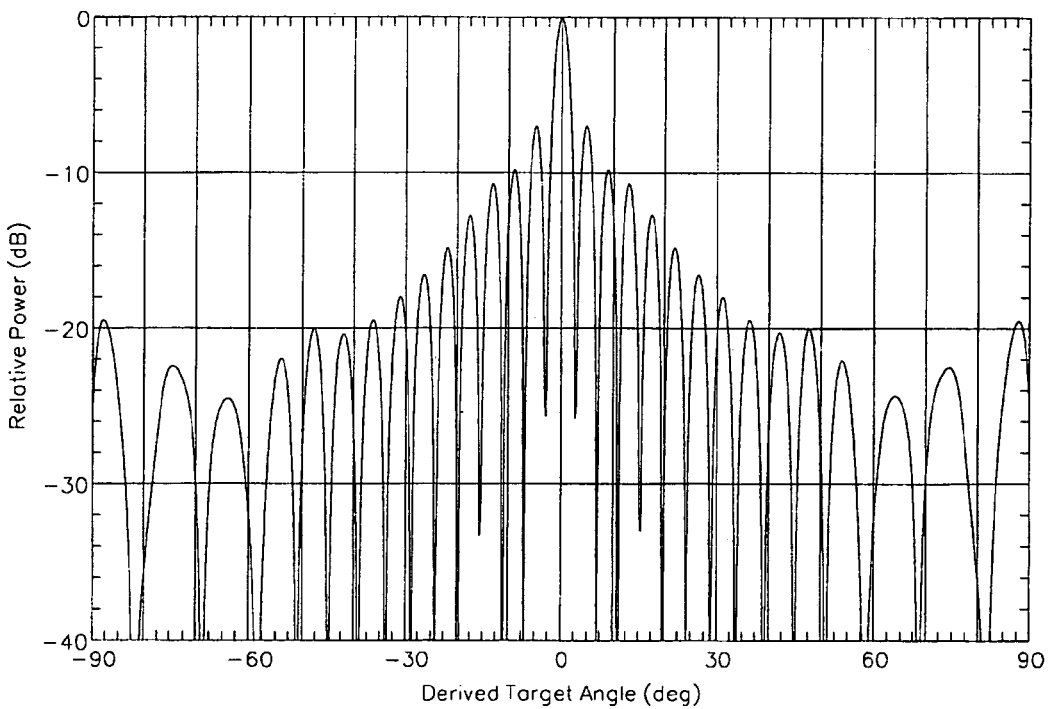
Figure 17. Compressed Beam Pattern for Linear Array
(no weighting, a = 0.018, ±60° scan, target at 0°)

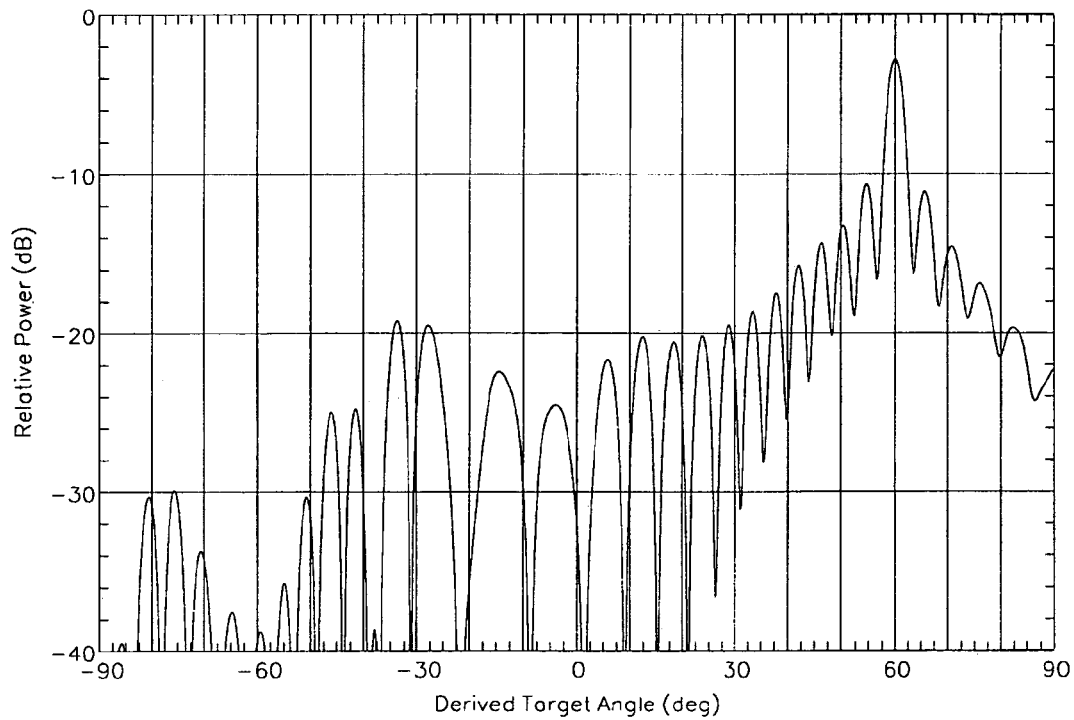
Figure 18. Compressed Beam Pattern for Linear Array
(no weighting, a = 0.018, ±60° scan, target at 60°)
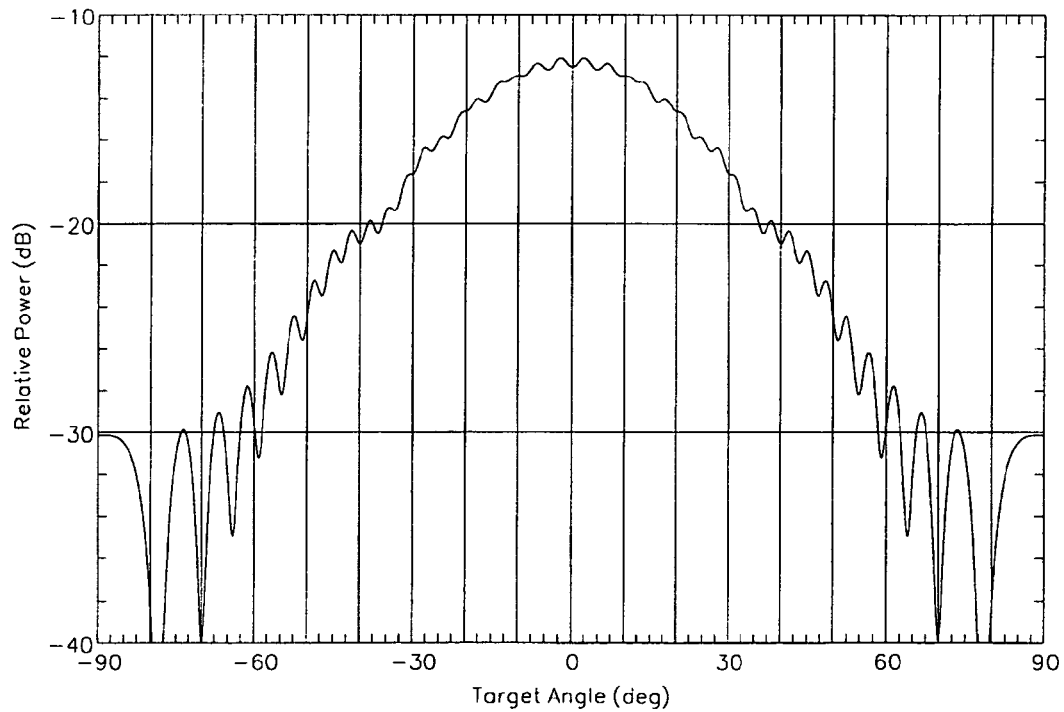
Figure 19. Broadened Beam Pattern for Linear Array (with weighting, a = 0.018)

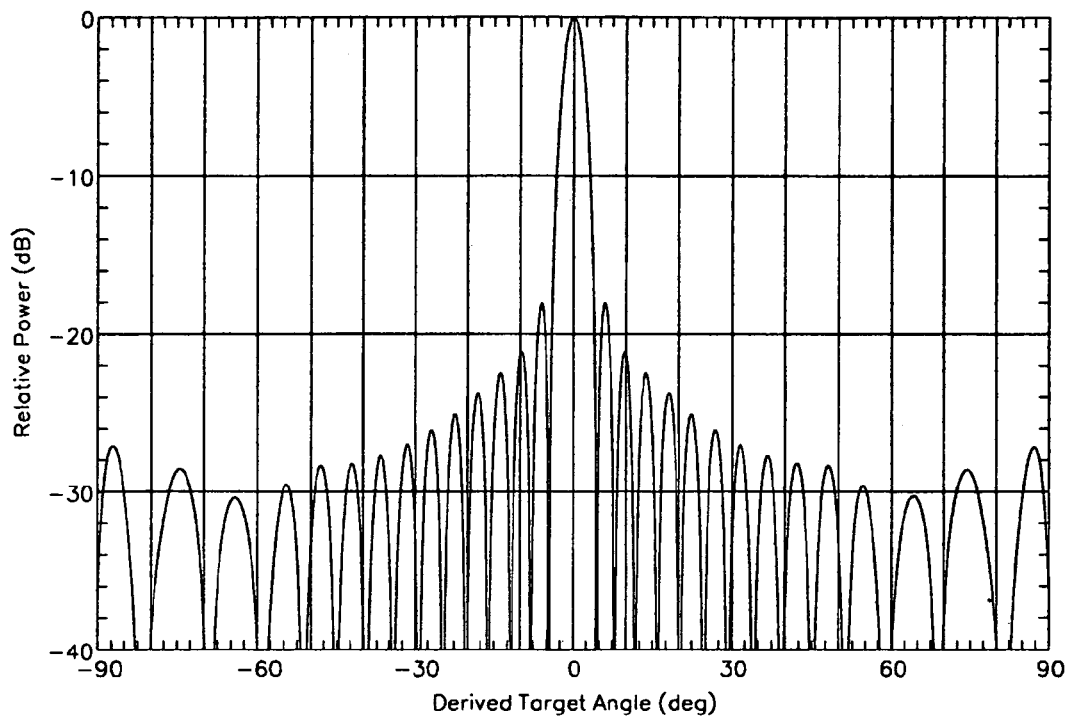
Figure 20. Compressed Beam Pattern for Linear Array
(with weighting, a = 0.018, ±60° scan, target at 0°)
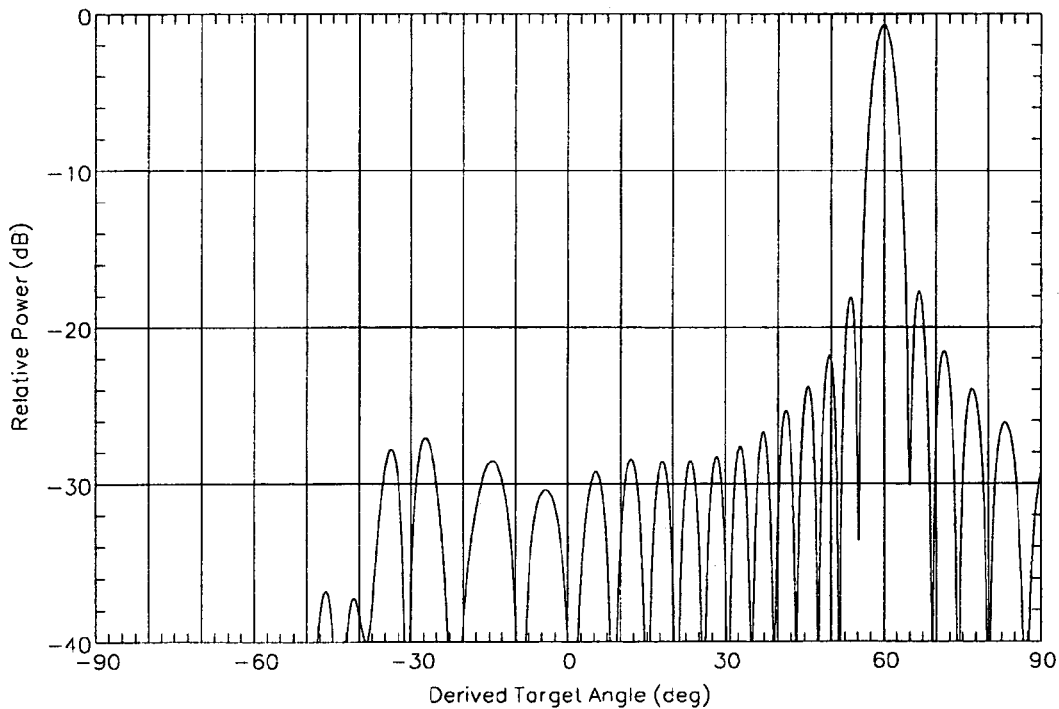
Figure 21. Compressed Beam Pattern for Linear Array
(with weighting, a = 0.018, ±60° scan, target at 60°)

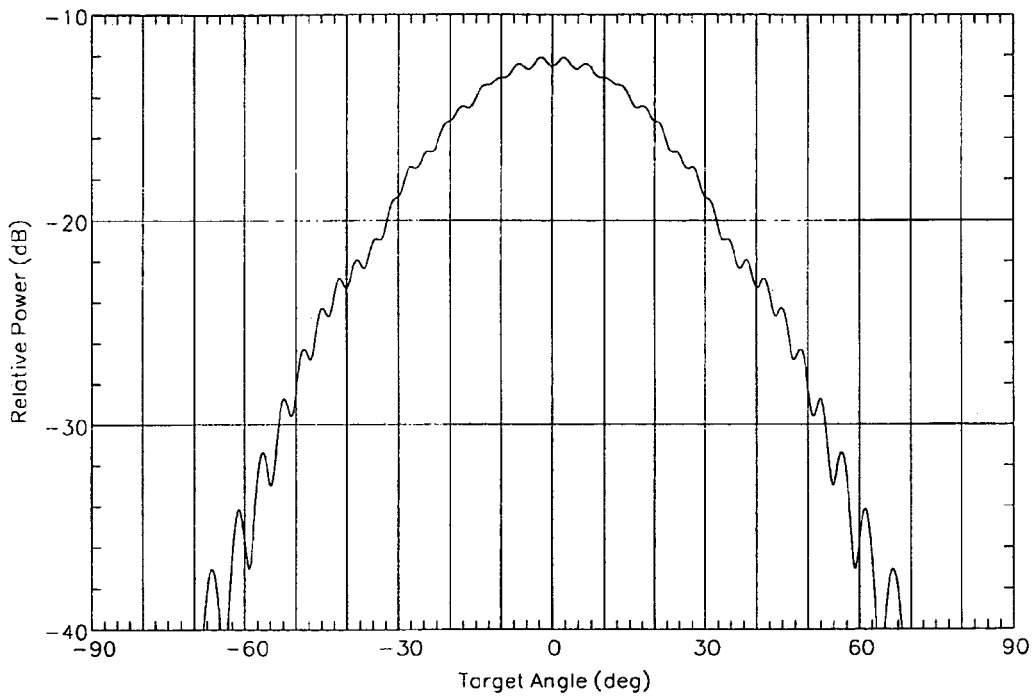
Figure 22. Broadened Beam Pattern for Linear Array
(with element pattern and weighting, a = 0.018)
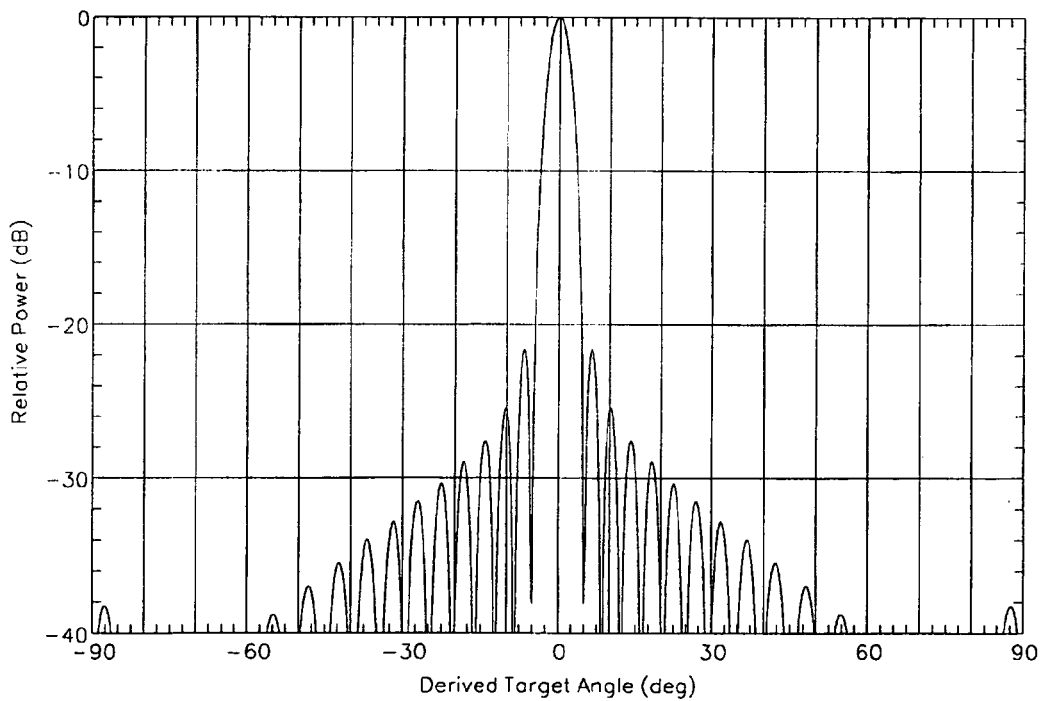
Figure 23. Compressed Beam Pattern for Linear Array
(with element pattern and weighting, a = 0.018, ±60° scan, target at 60°)

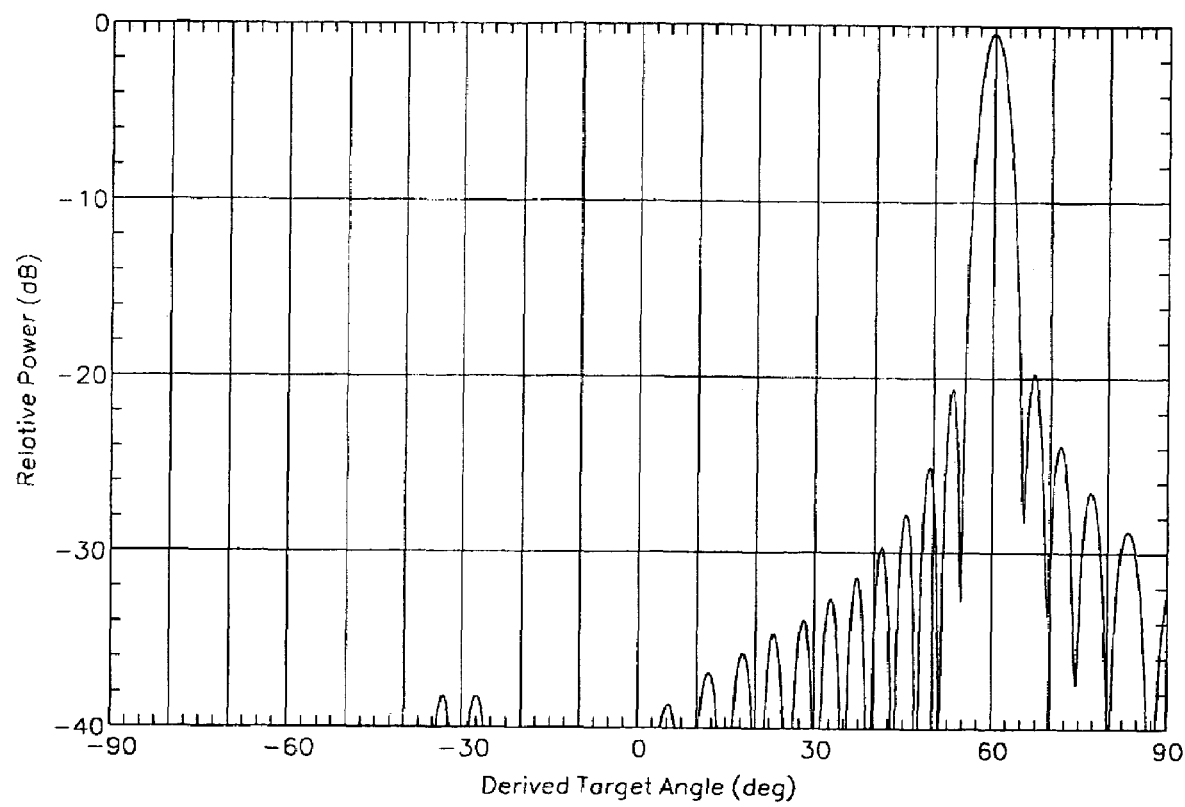
Figure 24. Compressed Beam Pattern for Linear Array
(with element pattern and weighting, a = 0.018, ±60° scan, target at 0°)

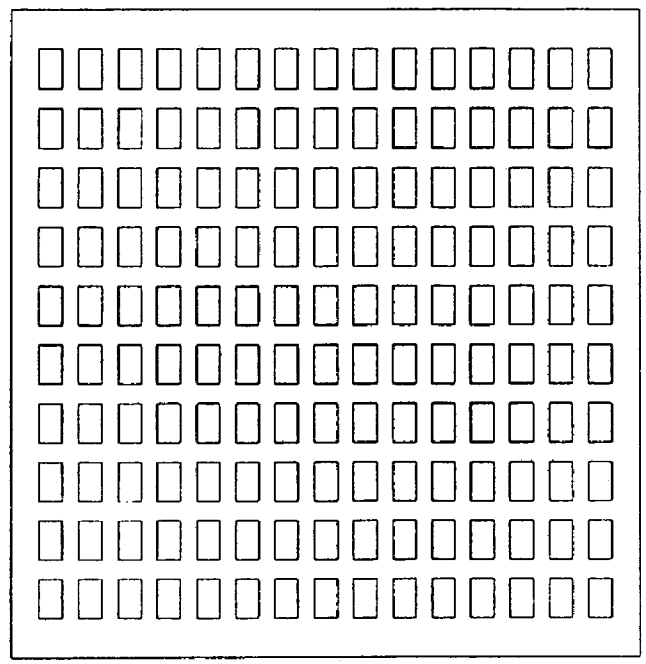
Figure 25a. Illustration of Face of Two-Dimensional Planar Array
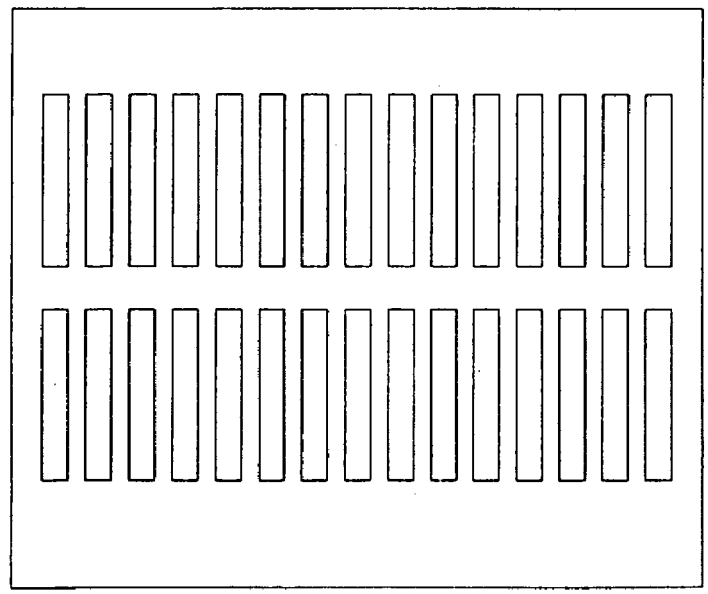
Figure 25b. Illustration of Face of Two-Dimensional Planar Array
Showing Two Rows of Directive Elements in Elevation
(a separate receiver is used for each row)

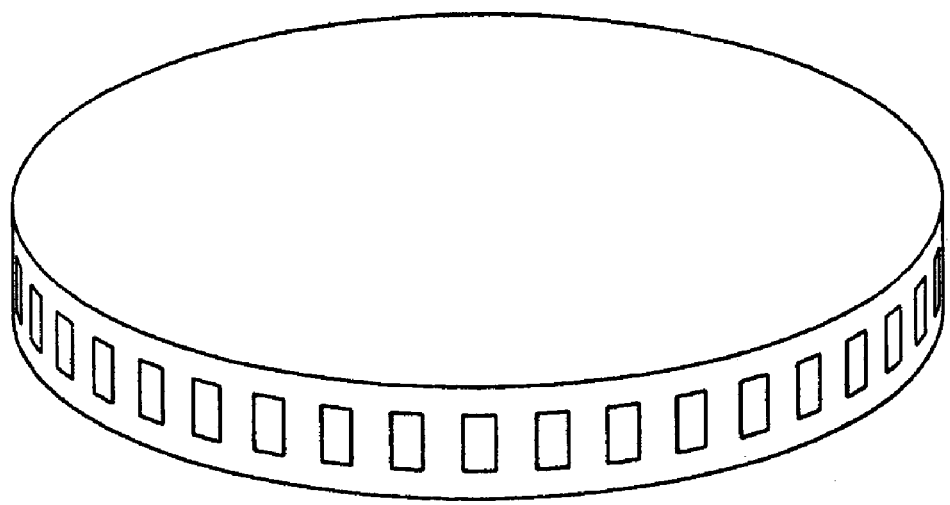
Figure 26a. Exterior View of Circular Phased Array
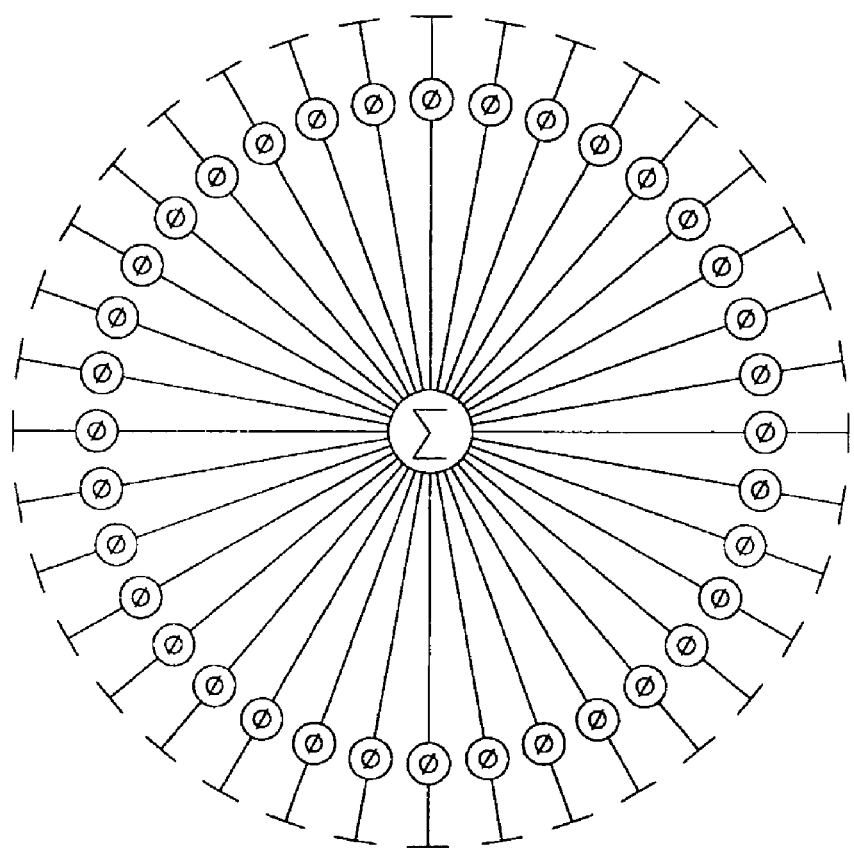
Figure 26b. Schematic Diagram for Circular Phased Array

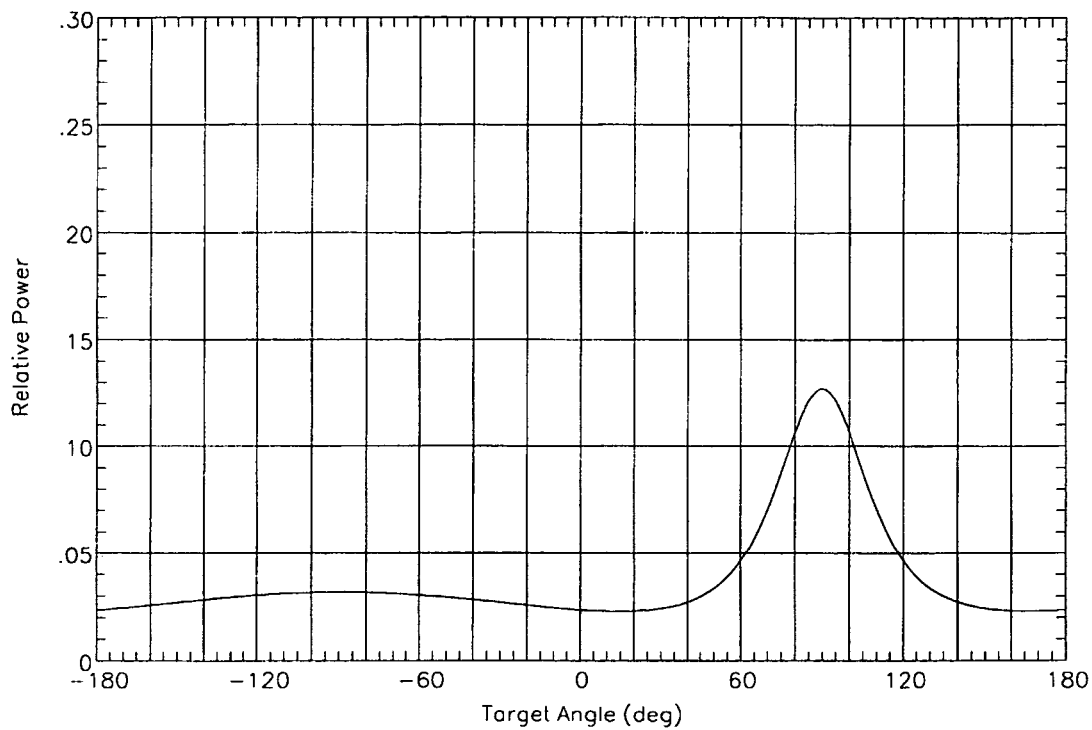
Figure 27. Broadened Beam Pattern for Circular Array (b = 30)
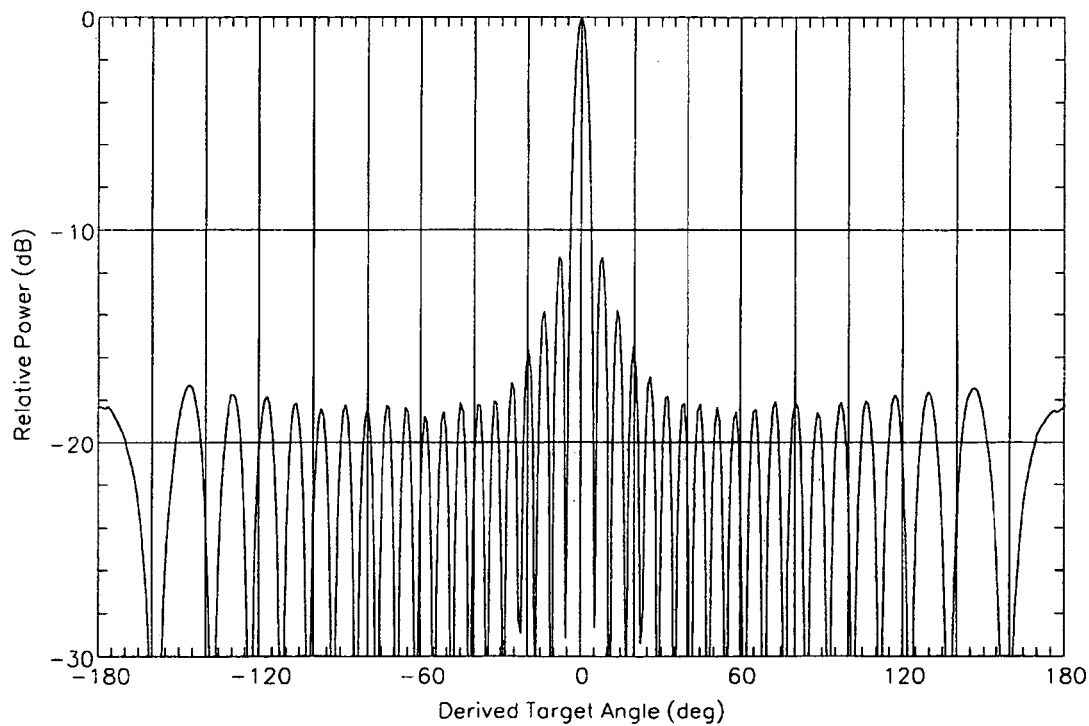
Figure 28. Compressed Beam Pattern for Circular Array (b = 30)

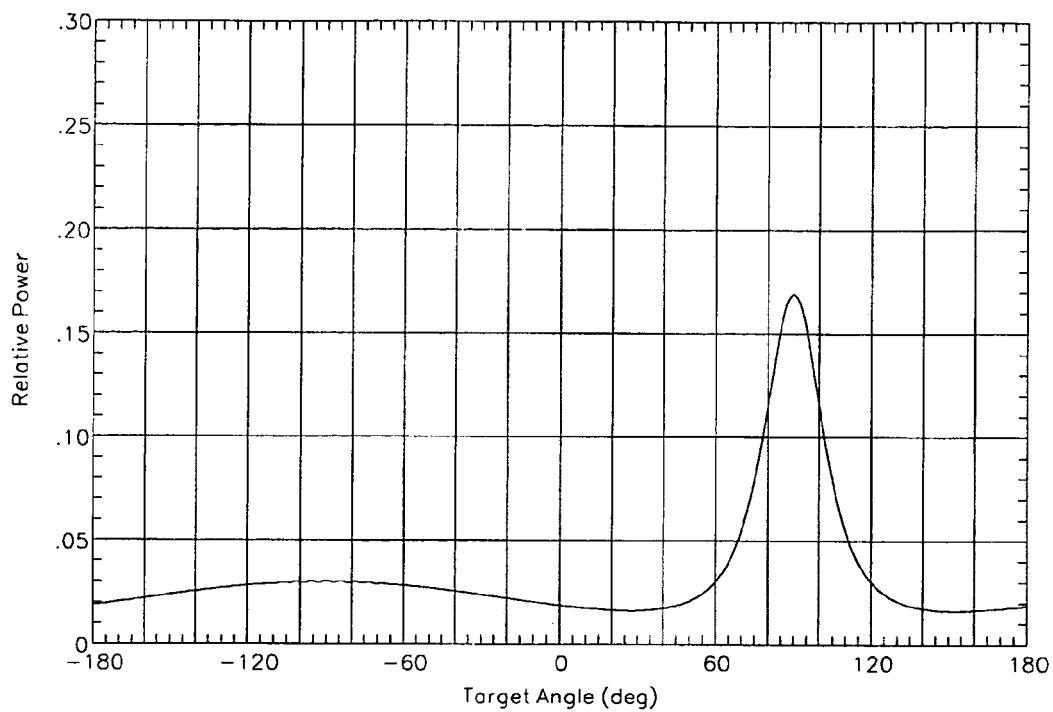
Figure 29. Broadened Beam Pattern for Circular Array (b = 35)
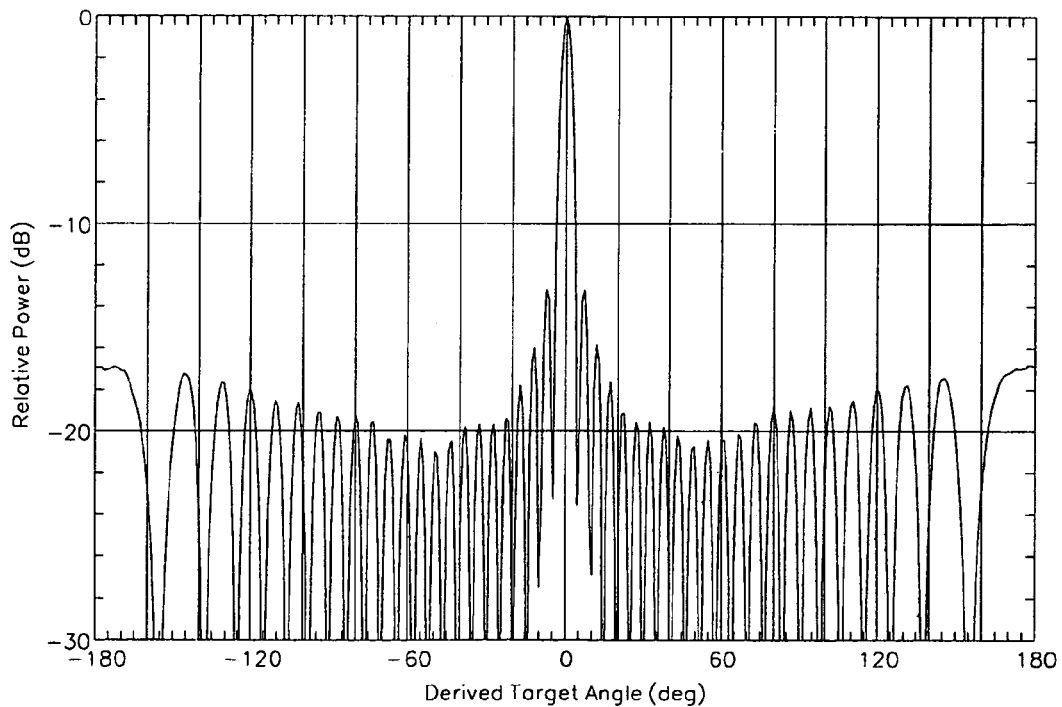
Figure 30. Compressed Beam Pattern for Circular Array (b = 35)

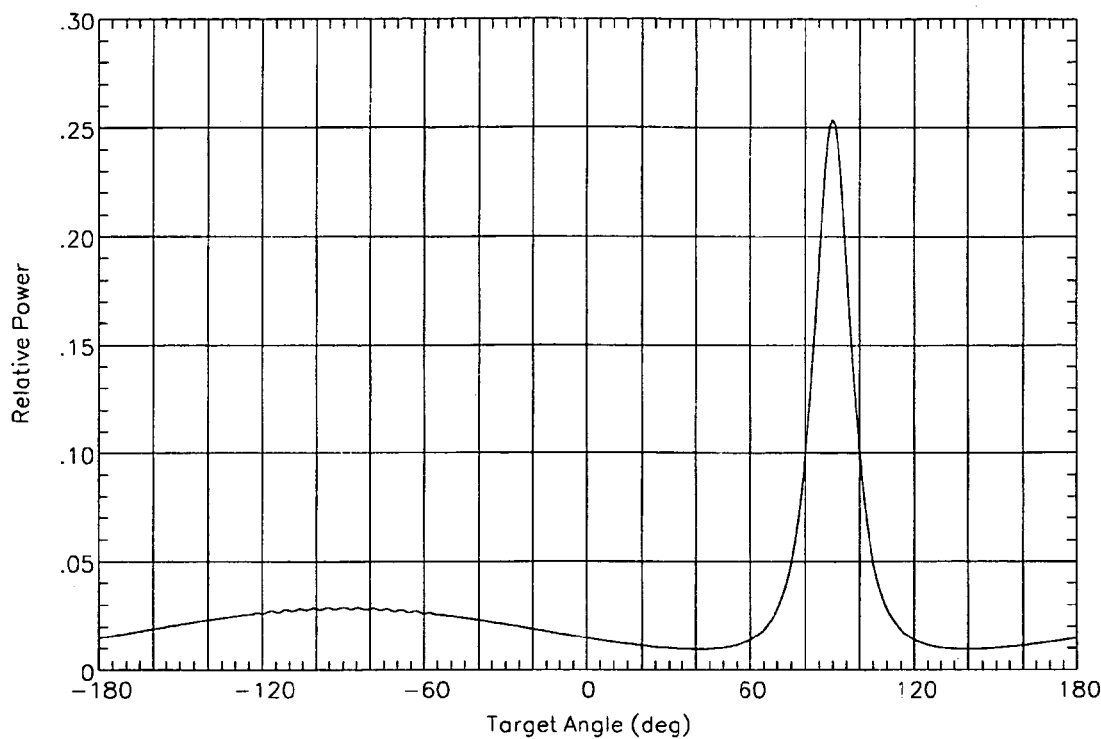
Figure 31. Broadened Beam Pattern for Circular Array (b = 40)
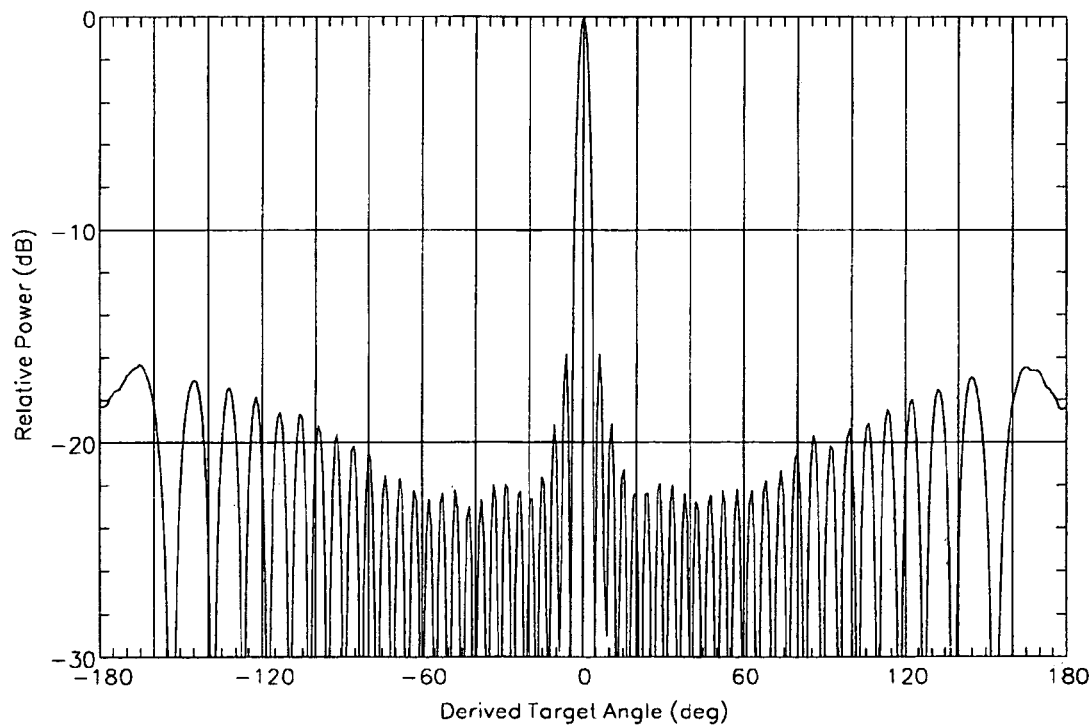
Figure 32. Compressed Beam Pattern for Circular Array (b = 40)

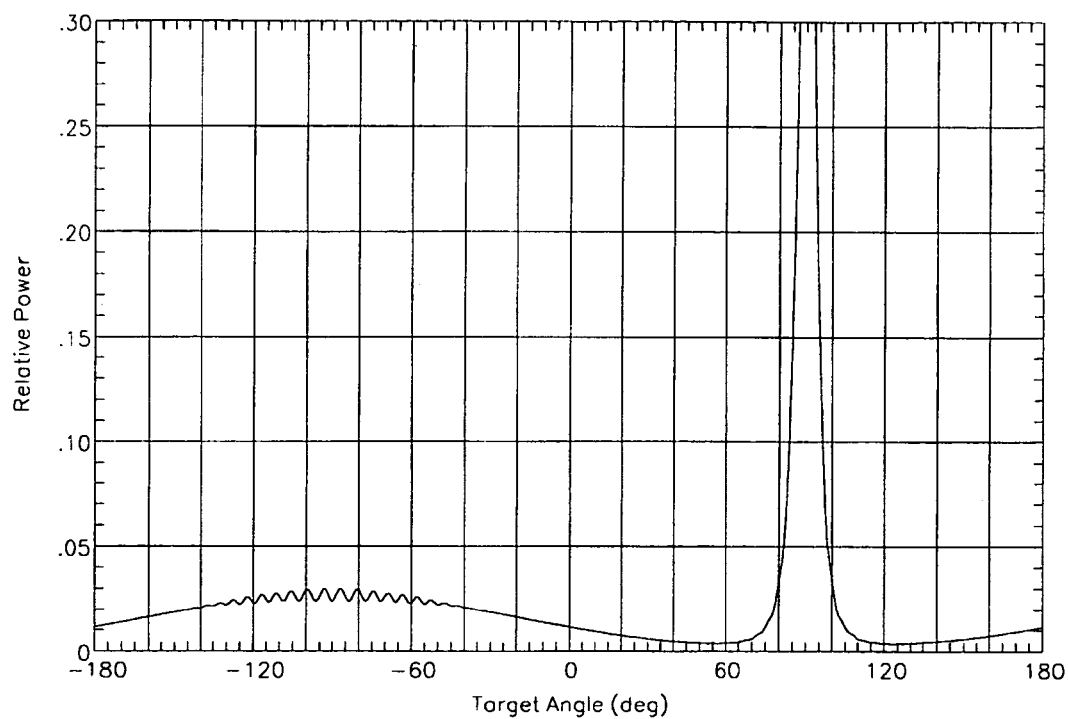
Figure 33. Broadened Beam Pattern for Circular Array (b = 45)
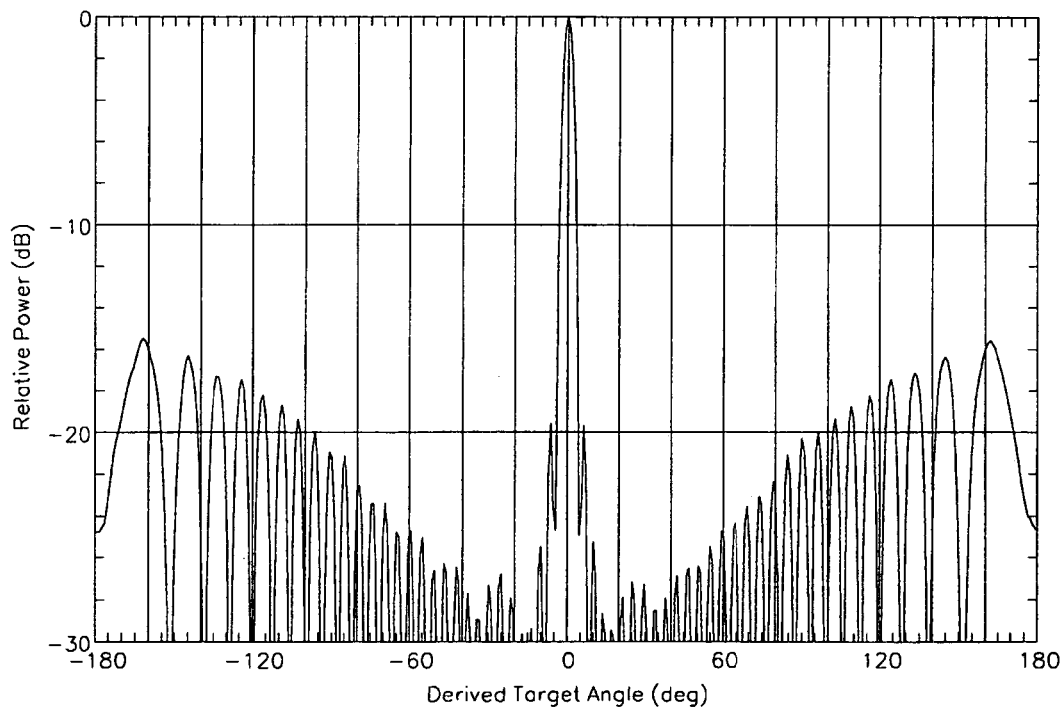
Figure 34. Compressed Beam Pattern for Circular Array (b = 45)

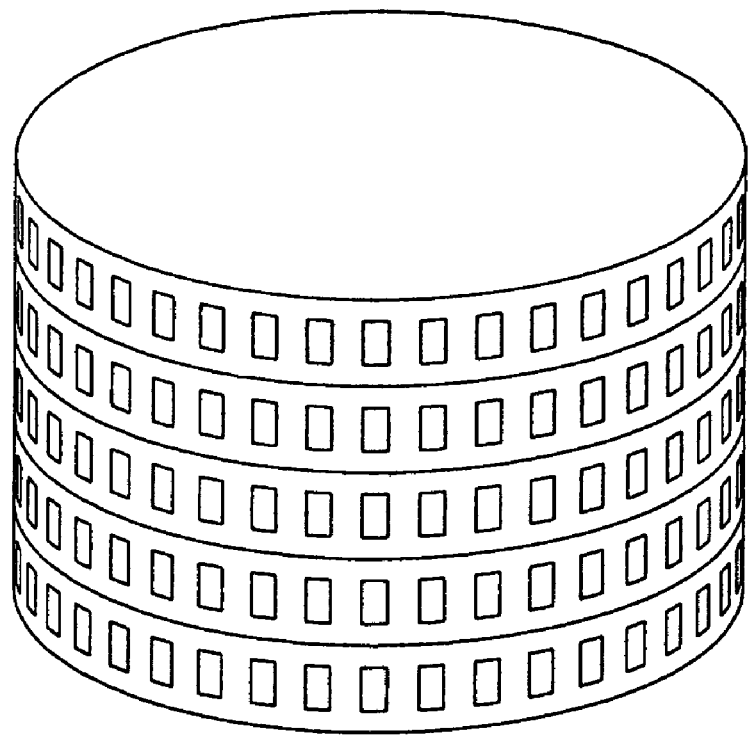
Figure 35. Exterior View of Cylindrical Phased Array
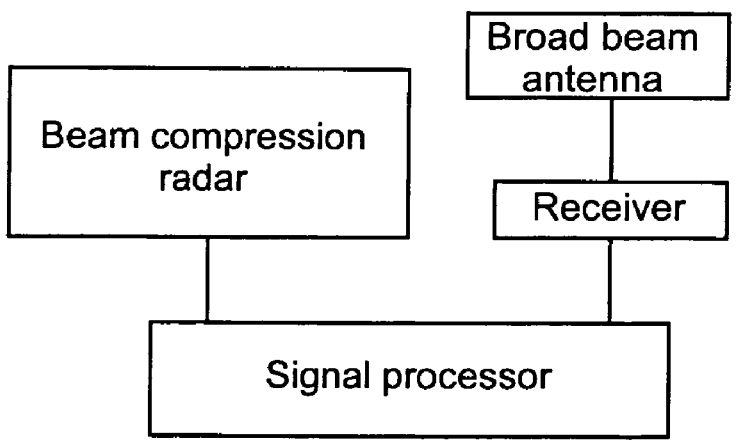
Figure 36

BEAM COMPRESSION RADAR

BACKGROUND OF THE INVENTION

1. Field of the Invention

The present invention relates to the field of radar systems and methods.

2. Prior Art

Conventional radar scans the environment with a narrow beam, dwelling in each beam position for a relatively short time, typically for a few milliseconds. Such a short time is adequate for the detection of targets in thermal noise. However, since targets usually must be tracked, the beam must revisit each target position sufficiently often to maintain track on all targets. This flexibility in the scheduling of beam positions is achieved with a phased array antenna. The phasing of the array elements is controlled so that the beam can be pointed in any arbitrary direction, within limits, at any time.

This flexibility in orienting the beam solves only part of the radar problem. Tasks such as target detection in clutter and target analysis (discrimination, classification or identification) require relatively long dwell times on each target, perhaps as much as one second in the case of target analysis. In most applications the radar must also accommodate multiple targets within the search space, and the number can be quite large. The problem then is to provide the required dwell time on each target as well as rapid updates on those in track, and yet still continue to search for new targets, all within a reasonable search frame time.

This common radar problem cannot be solved by beam pointing agility. It can be solved by broadening the transmit beam and implementing multiple simultaneous receive beams, which also requires multiple receivers (the number is approximately the same as the number of simultaneous beams). In order to provide both sufficiently long dwell times and rapid track updates, the number of receivers can be quite large, leading to a very complex and expensive radar system.

BRIEF DESCRIPTION OF THE DRAWINGS

FIG. 1a is a graph illustrating a conventional radar antenna beam pattern versus angle.

FIG. 1b is a schematic representation of a radar system in accordance with the present invention using a single transmit/receive antenna.

FIG. 1c is a schematic representation of a radar system in accordance with the present invention using separate transmit and receive antennas.

FIG. 1d is a schematic representation of a radar system in accordance with the present invention using stacked antennas for sensing angle in a second dimension using multiple receivers.

FIG. 1e is a schematic representation of a radar system in accordance with the present invention using stacked antennas for sensing angle in a second dimension using a single receiver.

FIG. 2 is a graph illustrating a broad transmit beam pattern versus angle.

FIG. 3 is a graph illustrating a receive beam pattern versus angle created by a phased array antenna, where the pattern has been broadened with a nonlinear phase progression applied to the array elements.

FIG. 4 is a graph illustrating the receive beam pattern in FIG. 3 being scanned in angle across the search space, either mechanically or electronically.

FIG. 5 is a graph of a modulated return from a target versus time as the pattern in FIG. 3 is scanned across the search space.

FIG. 6 is a graph of a reference modulation pattern representing the modulated receive signal returned from a target at a known angle versus time as the pattern in FIG. 3 is scanned across the search space.

FIG. 7 is a graph illustrating the cross-correlation of the graphs of FIGS. 5 and 6, showing the presence of a target indicated by the peak of the graph.

FIG. 8 is a schematic of a linear phased array that may be used with the present invention.

FIG. 9 shows the beam-broadened pattern versus target angle for a linear array consisting of 51 elements and a=0.012 using quadratic phasing.

FIGS. 10 through 13 show the correlation results for the target angle $\theta_t$=0°, 10°, 20°, and 30°, respectively, where the extent of the electronic scan is ±30° for the broadened pattern of FIG. 9.

FIGS. 14 and 15 show the correlation results for the target angle $\theta_t$=0° and 30°, respectively, where the extent of the electronic scan is ±60° for the broadened pattern of FIG. 9.

FIG. 16 shows the beam-broadened pattern versus target angle for the linear array consisting of 51 elements and a=0.018 using quadratic phasing.

FIGS. 17 and 18 show the correlation results for the target angle $\theta_t$=0° and 60°, respectively, where the extent of the electronic scan is ±60° for the broadened pattern of FIG. 16.

FIG. 19 shows the beam-broadened pattern versus target angle for the linear array consisting of 51 elements and a=0.018, with cosine-on-a pedestal weighting where the weighting at the array edge is 20% down from the center.

FIGS. 20 and 21 show the correlation results for the target angle $\theta_t$=0 and 60°, respectively, where the extent of the electronic scan is ±90° for the broadened pattern of FIG. 19.

FIGS. 22 through 24 repeat the conditions in FIGS. 19 through 21, except the element pattern is now given by cos θ.

FIGS. 25a and 25b illustrate how a linear array can be extended in the vertical dimension to create a two-dimensional planar array; FIG. 25b illustrates how directive elements can be used in the vertical plane to reduce the number of layers and receivers needed to cover a given elevation angle sector.

FIGS. 26a and 26b illustrate a circular array with equally spaced elements.

FIG. 27 illustrates the broadened pattern for a circular array with N=100 elements and a modulation index of b=30, where a cosine function is assumed for the element pattern.

FIG. 28 illustrates the correlation results for the beam broadened pattern of FIG. 27.

FIGS. 29 through 34 show corresponding broadened and compressed patterns for the modulation indices b=35, 40, and 45.

FIG. 35 illustrates a circular array as extended in the vertical dimensions by stacking layers of one-dimensional arrays to conform to a cylinder.

FIG. 36 is a schematic representation of a beam compression radar in accordance with the present invention also incorporating an anti-jamming capability.

DETAILED DESCRIPTION OF THE PREFERRED EMBODIMENTS

A conventional radar uses an antenna with a narrow beam, as illustrated in FIG. 1a. Such antennas are of two general types: reflectors and arrays. The latter can be either non-scanning or scanning, where the scanning is achieved either with frequency or phase steering. This discussion is based primarily on the phase-steered array, which is commonly called a phased array antenna, though it is also applicable to array antennas that include some type of mechanical rotation. A phased array antenna consists of a set of antenna elements, usually equally spaced, and arranged along a line (the so-called linear array), a plane (the so-called planar array), or conforming to some other solid surface (e.g., cylinder or cone). In its most general form, a separate phase shifter is used with each array element. The phase shifts are controlled in real time by a computer.

With a linear phase progression across the array, the beam can be steered to a particular angle with respect to the mechanical (broadside) axis of the array. The beam will be broadened slightly as the beam is steered away from the mechanical axis.

If the same antenna is used on both transmit and receive, the waveform must be pulsed so that the receiver can be switched off while the transmitter is on. Use of continuous wave (CW) or FM/CW operation is also possible, but this mode of operation requires separate antennas for transmit and receive.

The preferred embodiments of the present invention are based on use of a phased array antenna, but in an unconventional manner. In particular, the beam is intentionally broadened by applying a nonlinear phase progression across the array. This broadened beam is then scanned across the surveillance sector by either mechanical rotation or by adding a time-varying linear phase progression to the nonlinear phase progression. This scan creates a modulated return from each target.

This modulation is then removed in the signal processor to compress the beam, which allows returns from targets to be resolved in angle. The detection performance is comparable to what would be achieved with a conventional narrow-beam antenna, except that all targets are now illuminated continuously, which provides additional benefits in terms of better tracking, better clutter suppression, and more reliable target analysis.

There are three possible modes of operation: (1) use of the same phased array antenna on both transmit and receive (schematically shown in FIG. 1b); (2) use of a conventional wide-beam non-scanning antenna on transmit combined with the phased array on receive (schematically shown in FIG. 1c); and (3) use of the phased array antenna on transmit combined with a conventional wide-beam non-scanning antenna on receive (schematically shown in FIG. 1d). The first mode is applicable to only pulsed type waveforms, but it has the advantage that high antenna gain is achieved on both transmit and receive. The other two modes are compatible with both pulsed and CW-type waveforms, but the high antenna gain is achieved in only one dimension. The disadvantage with the third mode is the high transmit power that the phased array antenna may have to handle. The following description is based on the second mode of operation, with the first and third modes being described thereafter.

For the second mode of operation, the transmit beam will preferably be broad enough to illuminate the entire surveillance sector continuously, as shown in FIG. 2. It will preferably be created by a conventional non-scanning antenna. The antenna beam on receive will be created by a phased array antenna, but it will be deliberately broadened to illuminate the entire surveillance sector. The beam broadening will be created by applying a nonlinear phase progression across the array, with the combined outputs of the array preferably being coupled to a single receiver. The receive pattern will have fluctuations in both amplitude and phase versus angle to a target, as illustrated in FIG. 3.

This broadened receive pattern is then scanned across the surveillance sector, as sketched in FIG. 4, which can be done by rotating the array either mechanically or electronically, where the latter is achieved by applying an additional linear phase progression across the array before combining the receive signals. The return from a particular target will be modulated according to the amplitude and phase fluctuations in the pattern, as sketched in FIG. 5.

A reference modulation signal will be pre-stored in the radar signal processor that will be derived from the broadened pattern on receive, as illustrated in FIG. 6. This reference modulation signal will represent the variation with time of the receive signal from the beam-broadened phased array as it scans across a target in the far field and at a fixed reference angle to the receive array. For a linear array, the fixed reference angle would typically be on the mechanical axis of the array, assuming an electronic scan, or on the mechanical axis of the array in the mid-scan position if a mechanical scan is used.

The actual return is cross-correlated with the reference signal. This will remove the modulation and compress the signal in time, as illustrated in FIG. 7. The relative timing of the correlation peak indicates where the target is in angle. This same phenomenon also applies if there are multiple targets present, as a correlation peak will be formed for each target, provided they are resolvable. The width of the correlation peak (the resolution) will scale approximately as the beamwidth of the array when it is phased in the conventional manner. The narrow width of this peak is what allows multiple targets to be resolved in angle.

Regardless of the mode or waveform, the correlation process used to compress the beam is similar, as it is applied separately to the time sequence of each of the range-gated outputs in the receiver, after pulse compression, if such waveforms are used. In other words, range gating (pulse compression) is done first, and the time sequence of outputs of a given range gate is processed to compress the beam. This beam compression processing is then repeated for each range gate.

Stated differently, regardless of how the beam compression concept is implemented, the first processing step is range gating, which is equivalent to pulse compression if a phase or frequency modulated waveform is used. This provides resolution in range. For illustration purposes, assume the range-gated outputs are stored in columns of a matrix, where each column represents the response of one pulse.

A moving target will introduce a Doppler (frequency) shift on the return signal. If the signal-to-interference ratio is sufficiently high, it will be possible to detect the target by conventional Doppler filtering procedures. Thus it is usually implemented as Fourier transform processing on each row of the above matrix. After the target is detected, the known Doppler shift can then be included in the correlation processing to compress the beam, which is implemented on the same row of the matrix. The timing of the correlation peak indicates the angular position of the target with respect to the reference axis.

If the signal-to-interference ratio is too low, due to the presence of strong clutter, for example, then the processor will have to search for the unknown target motion as part of the correlation process. In other words, the correlation process in this case is in effect a two-dimensional search for both the target Doppler and its angular position. Compressing the beam will also suppress the interference, which will allow the target to be detected. This two-dimensional search may be done by calculating what the return would have been for each of multiple possible target motions and correlating each to the reference signal, or calculating (or prestoring) what would be reference signals for each of a plurality of target motions and correlating the return with each of the calculated reference signals.

If the motion of the target is so great that the return can drift through several range cells during the processing time, then it is possible to eliminate most of this drift with keystone processing (which is discussed subsequently). This processing is applied prior to pulse compression. Thereafter, the processing for target detection and the angle measurement is the same as above.

Note that this signal processing is conceptually relatively simple, though relatively processing intensive. Still, with the capabilities of today's processors, and typically using a parallel processing architecture, the implementation of the present invention is very practical. Also note that this processing in angle is done independently of the processing used to obtain resolution in range and Doppler, which may be done using well-known techniques.

The above discussion is concerned primarily with a phased array antenna that has independent phase shifters at each array element. The same principle also applies to an array antenna without phase shifters, where the beam is broadened by physically displacing the array elements from the nominal array surface. This displacement would accomplish the same effect on the pattern as the nonlinear phase progression across the phased array. In this case, unless phase shifters were still included, rotation of the broadened beam would be accomplished by mechanical means.

Now having provided an overview of certain preferred embodiments, a more detailed analysis of the beam compression radar of the present invention will now be described.

Analysis of Beam Compression Radar Invention

Consider an array of N isotropic antenna elements arranged in some geometric pattern, in one dimension or more, and let $\phi_n$ be the phase associated with the nth element. The transmit field radiated in a particular direction, in complex signal notation, is given by the summation $$V = \sum_n \exp(j\phi_n) \exp(-j2\pi\delta_n/\lambda) \quad (1)$$

where $\delta_n$ is the differential range for the nth element of the array, $\lambda$ is the wavelength, and j is the square root of $-1$. In the antenna community this expression is commonly referred to as the array factor. The voltage received from a point target in the specified direction is given by the complex square of equation (1). However, there are alternatives to using this phased array on both transmit and receive. For example, one could just as easily transmit a conventional non-scanning broad pattern to illuminate the sector of interest, and then use the phased array only on receive, in which case equation (1) would apply to the receive signal. This is the convention used in the following analysis.

Linear Array

As an illustration, consider a linear array such as schematically shown in FIG. 8 where the phase is shifted in a quadratic (nonlinear) fashion across the array, so that one can write $$\phi_n = an^2$$

$$\delta_n = x_n \sin\theta$$

where $\theta$ is the azimuth angle of the target relative to the array broadside, $x_n$ is the distance of the nth element from the center of the linear array, a is a constant that determines the degree of the nonlinear phasing, and the indexing is symmetrical about n=0. For this analysis the element spacing is constrained to be $\lambda/2$ (a wider spacing is possible in practice), so that $$V(\theta) = \sum_n \exp[j\pi(an^2 - n\sin\theta)]$$

FIG. 9 shows the pattern for 51 elements and a=0.012. The beam is spread in angle over about ±30°. Without quadratic phasing the half-power beamwidth would be 2.0° and the first sidelobe would be at −13 dB. The power scale in this figure is such that the gain at broadside would be unity for a conventional phased array. In other words, the 2° beam is broadened by a factor of about 30, which means that the gain is reduced by about the same factor.

The receive array is rotated or electronically scanned to generate the modulated signal. Let $\theta_k$ be the kth position in the scan sequence and $\theta_t$ the unknown angle of the target. The received voltage for the kth position is given by $$V(\theta_k) = \sum_n \exp[j\pi(an^2 - n\sin(\theta_t - \theta_k))] \quad (2)$$

Next is the correlation process, which can be written as $$C(\theta_m) = \sum_k V(\theta_k) V^*(\theta_k - \theta_m) \quad (3)$$

where the asterisk denotes a complex conjugate.

This correlation process is in effect a search for the unknown angle $\theta_t$, which is equivalent to solving for the value of $\theta_m$ that maximizes the magnitude of equation (3).

FIGS. 10 through 13 show the correlation results for $\theta_t$=0°, 10°, 20°, and 30°, respectively, where the extent of the electronic scan is ±30°. In each case the correlation peak occurs at the correct position. The half-power width of the compressed beam in FIG. 10 is 2.4° and the first sidelobe is slightly below −11 dB, so there is some degradation in resolution performance in this case compared to a conventional phased array (2.0° and −13 dB). The half-power width of the compressed beam at the scan angle of 30° in FIG. 13 is 4.8°, compared to 2.3° for a conventional phased array. The power scale for the plots in FIGS. 10 through 13 is referenced to the gain for a broadside target.

Note the considerably reduced gain for the target at 30° in FIG. 13. It is about −4.5 dB, compared to only about −0.6 dB for a conventional phased array (this "scanning loss" is also consistent with the increased beamwidth). There is a simple explanation for this loss. When the pattern in FIG. 9 is scanned ±30° across a target at 0°, practically all of the pattern will be compressed in the correlation processing. However, when the same pattern is scanned across a target at 30°, only about half of it will encompass the target, and therefore only half of the return will be compressed. In order to be able to fully compress the return, the scan will have to be increased to ±60°. The results for this case are shown in FIGS. 14 and 15 for $\theta_t$=0 and 30°. The half-power widths of the compressed beams are 2.2° and 2.3°, respectively, which are now comparable to those of a conventional phased array, and the reduction in gain in FIG. 15 is also comparable.

Coverage of ±30° is fairly limited for a phased array, as most phased arrays are designed to electronically scan over ±60°. For comparison, FIG. 16 shows the broadened pattern for 51 elements and a=0.018, which is smeared over almost ±90°. FIGS. 17 and 18 show the compressed patterns for $\theta_t$=0° and 60°, respectively, where the extent of the scan is ±60°. In each case the correlation peak occurs at the correct position. The half-power width of the peak in FIG. 17 is 2.7°, compared to 2.2° in FIG. 14, and 2.0° for a conventional phased array. The reduction in gain in FIG. 18 of about 3 dB is consistent for a 60° scan off of broadside.

Energy Efficiency

Now examine how well the beam compression radar concept compares with a conventional phased array in terms of energy efficiency. In this comparison the antenna gain on transmit is not a factor since it makes no difference in detection performance whether a narrow scanning beam dwells in each of n beam positions for 1/nth of the search frame time or a wide non-scanning beam dwells for the entire time. It is only the antenna gain on receive that matters.

The effective energy (for detection purposes) for a conventional phased array radar is proportional to the product of the antenna gain and the time spent in each beam position (assuming this entire time is used for detection). Let us designate $T_s$ as the search frame time and $N_b$ as the number of beam positions to be searched. The effective energy for the conventional phased array radar is then proportional to $$E_{par} = (T_s/N_b)[\Sigma w_n]^2$$

where $\{w_n\}$ is the set of weights applied to the array elements.

Now for the beam compression radar, designate $N_s$ as the number of discrete steps in the correlation process in equation (3). The effective energy is given by $$E_{bcr} = (T_s/N_s)\Sigma |V(\theta_k)|^2$$

In this comparison the sum of the array weights is unity in both cases, so that the ratio of the energies is given by $$\eta = E_{bcr}/E_{par} = (N_b/N_s)\Sigma |V(\theta_k)|^2 \quad (4)$$

This quantity is defined as the energy efficiency factor of the beam compression radar.

In FIGS. 14 and 15, which covers ±30°, there are essentially $N_b$=30 beam positions for a conventional phased array radar with a 2° beam. In this case $\eta$=5.8. In other words, the beam compression radar is over 7 dB more efficient than the conventional phased array radar in terms of energy. The comparison is even more dramatic for coverage of ±60° in FIGS. 17 and 18, where $N_b$=60 and $\eta$=11.6. Thus the beam compression radar is over 10 dB more efficient. Note that these efficiencies do not include the so-called beam-shape loss for a conventional scanning beam radar, where a target will not generally appear on-axis in any beam position. There is no loss of this type with the beam compression radar.

Weighted Linear Array

Amplitude weighting can be used across the array to reduce the correlation sidelobes, but at the cost of a reduction in the effective aperture width. FIG. 19 shows the broadened pattern for a=0.018 and cosine-on-a pedestal weighting of 51 elements, where the weighting at the array edge is 20% down from the center. The corresponding compressed patterns are shown in FIGS. 20 and 21 for $\theta_t$=0 and 60° and a scan of the broadened beam of ±90°. The half-power beamwidths are 3.7° and 4.0°, respectively, compared to 2.6° and 5.2° for a conventional phased array with the same amplitude weighting. The highest sidelobes are about 18 dB down, and the energy efficiency factor $\eta$ is 4.5. The sidelobe level has been reduced by about 7 dB compared to uniform weighting in FIGS. 17 and 18, at a cost of only about 1 dB in terms of energy efficiency.

Weighted Linear Array with Element Pattern

In the above discussion the element patterns were assumed to be isotropic. FIGS. 22 through 24 repeat the conditions in FIGS. 19 through 21, except the element pattern is now given by cos θ. The broadened pattern in FIG. 22 is similar to that in FIG. 19, except it is lower at the extremities and the ripples are somewhat smoother. The half-power beamwidths in FIGS. 23 and 24 are slightly wider, 4.1° and 4.4°, compared to 3.7° and 4.0°, and the first sidelobes are about 2 to 3 dB lower. The energy efficiency factor $\eta$ is 3.4, about 1.2 dB less than in the isotropic case.

Removing the Amplitude Ripple

The scanning of the broadened beam across the target will cause the compressed return to be modulated in amplitude. For example, the return from a target at broadside will appear as in FIGS. 9, 16, 19, or 22, where angle is now time. This modulation will have no significant impact on detection, since detection is just a matter of energy. On the other hand, it will interfere with an analysis of the target return, for discrimination or classification purposes, where the amplitude of the return is important. Once the target position is known, it will be possible to remove most of the amplitude modulation using knowledge of the expected amplitude modulation with angle relative to the target. In this regard, the slightly smoother pattern in FIG. 22 will be easier to work with.

Two-Dimensional Planar Array

The linear array can be extended in the vertical dimension to create a two-dimensional planar array, as illustrated in FIG. 25a and schematically represented in FIGS. 1e and 1f. There are two choices for the vertical stacking: a separate receiver for each layer as in FIG. 1f, or one receiver for the entire array as in FIG. 1e. In the case of multiple receivers, the phasing sequence can be the same for each layer, and the multiple receiver outputs can be utilized to measure the target elevation angle, similar to monopulse processing. The elements can also have a directive pattern in the vertical plane as with the array configuration in FIG. 25b to reduce the number of layers and receivers needed to cover a given elevation angle sector. In the case of a single receiver for the entire array, quadratic phasing of the elements is applied in both dimensions in order to broaden the beam in both dimensions. This broad beam can be scanned in elevation after each scan in azimuth, in raster scan fashion, and correlation processing will then be used on the results of each scan to determine the target angle in two dimensions.

Circular Array

Consider a circular array with N equally spaced isotropic elements, as in FIGS. 26a and 26b. For this discussion the spacing around the circumference will be constrained to be λ/2, so that the radius of the array is given by Nλ/4π (a slightly wider spacing will be possible in practice). Let θ be the azimuth angle of the target measured in the plane of the circle. The differential delays in equation (1), relative to the center of the circle, are $$\delta_n = -(N\lambda/4\pi)\cos(\theta - \alpha_n)$$

where $$\alpha_n = 2\pi n/N$$

Substituting in equation (1)

$$V(\theta) = \sum_n \exp(j\phi_n)\exp[j(N/2)\cos(\theta - 2\pi n/N)] \quad (5)$$

where the dependence on the target angle is explicit.

The best choice for the phases $\{\phi_n\}$ appears to be a one-period sinusoidal function as $$\phi_n = b\sin(2\pi n/N) \quad (6)$$

where b is the modulation index in radians.

The next step is to rotate the array, which will be done electronically for illustrative purposes. Let $\theta_t$ be the unknown angle of the target. The received voltage for the kth position of the phase sequence is given by $$V_k = \sum_n \exp(j\phi_{n-k})\exp[j(N/2)\cos(\theta_t - 2\pi n/N)] \quad (7)$$

The correlation operation is given by $$C_m = \sum_k V_k V_{k-m}^* \quad (8)$$

There are N values of the mismatch index m, which means that the correlation output in equation (8) is quantized to $2\pi/N$ radians. However, there is also the opportunity to fine-tune the result by searching for the target angle $\theta_t$.

The way equation (5) is written, all array elements are visible from all angles. In practice, the pattern for each element may be limited to ±90° about a radial vector, and it would be tapered at the edges. For this exercise a cosine function for the element pattern is assumed. FIG. 27 shows the broadened pattern for N=100 elements and a modulation index of b=30. In contrast to the broadened patterns for the linear array, this pattern is very smooth, and the return should be easy to compensate after the beam is compressed. The compressed pattern for this case is shown in FIG. 28. FIGS. 29 through 34 show the broadened and compressed patterns for b=35, 40, and 45. The width of the compressed beam gets narrower as the modulation index is increased, and the level of the first sidelobe gets lower, but the level of the far sidelobes increases. The optimum value of the modulation index under these conditions is about 40 (in FIG. 32), where the near and far sidelobes are of comparable height. In this case the half-power width of the compressed beam is 4.0°, the highest sidelobes are at about −16 dB, and the energy efficiency factor η is 8.0.

Two-Dimensional Cylindrical Array

The circular array can also be extended in the vertical dimensions by stacking layers of one-dimensional arrays, as in FIG. 35. There are also two choices for the vertical stacking: a separate receiver for each layer, or one receiver for the entire array. In the latter case the starting phase within the sine-modulation in (6) should be different for each layer in order to broaden the beam in the elevation dimension. This broad beam will be scanned in elevation after each revolution in azimuth, with correlation processing being used for each scan to determine the target angle in two dimensions.

Other Two-Dimensional Configurations

It is also possible to apply the above design principles to two-dimensional arrays that conform to a cone, hemisphere, and practically any other convex geometrical surface.

On the Choice of Parameters

The parameters a and b determine the degree of phase progression across an array. Specific values of these parameters have been selected to provide the desired amount of beam broadening for the examples presented herein. In general, proper specification of these parameters may depend on the size of the array, the element spacing, the element pattern, and the particular weighting applied across the array.

Thus the preferred embodiments of the present invention provides continuous dwell on all targets within the search space with a conventional phased array antenna, which means that it can solve the problems outlined in the prior art section without sacrificing power. Moreover, it can do this in most cases with a single receiver, compared to the four that are often employed in a phased array radar to measure the target angle via monopulse processing. The hardware will thus be simpler than a conventional phased array radar. Most of the system sophistication is implemented in the signal processor(s), which is primarily a software development effort. The processing itself is straight forward, just processing intensive.

The continuous illumination of all targets offers the potential for far better tracking performance than what can be achieved with interrupted dwells in a conventional narrow-beam radar. Not only will the signal-to-noise ratio be better, but coherent tracking over long dwells provides far better accuracy than a conventional radar using Kalman filtering. Moreover, the problem of associating multiple tracks in a target rich environment is eliminated.

For modern radar applications, resolution is also needed in both range and Doppler. This is usually accomplished by transmitting a pulse compression waveform, such as linear-FM. The pulse is compressed in the receiver, and a sequence of returns is coherently processed for Doppler resolution. The rapidity of the phase modulation used for antenna beam compression is governed by the search frame time and the desired dwell time on target, which will typically be measured in seconds. The modulation used for pulse compression is, as usual, governed by the round-trip delay, which will typically be less than a millisecond. Thus the two time scales are about three orders of magnitude apart, which means that these separate modulations can be implemented without mutual interference.

An issue that does not concern beam compression directly is the potential need to search for the target range and its motion when long dwell times are used. The most demanding part of this search is for the unknown range and range rate, which can be greatly simplified with keystone processing to eliminate target migration in range (see Perry, R. P., et al., "SAR Imaging of Moving Target," *IEEE Trans. AES*, January 1999, pp. 188-200, the disclosure of which is incorporated herein by reference; although the subject of this paper is synthetic aperture radar, the keystone processing technique described therein is broadly applicable to any coherent radar). The search for higher-order range derivatives can also be simplified if it is done with some combination of coherent and noncoherent processing. These processing steps, as well as those needed to compress the beam, are processing intensive, but they are nevertheless practical with the computer technology available today.

The preferred embodiments of the beam compression radar concept provide essentially continuous illumination of a target, which is important for target analysis (discrimination, classification or identification). Also use of a broad beam on transmit reduces the likelihood that the radar signal will be intercepted by an adversary. Thus the beam compression radar, combined with the usual techniques of spreading the signal in time and frequency, offers a considerable degree of immunity to electronic countermeasures and anti-radiation missiles. However, if a jamming signal is nevertheless present, the beam compression radar, in its normal configuration, may not be able to detect targets.

There is also a relatively simple solution to this problem, which requires adding a separate broad beam antenna that does not scan, as well as a separate receiver, as shown in FIG. 36. The jamming signal received by this antenna will be used to cancel the signal received by the phased array antenna. Before the cancellation can take place, however, the angular position of the jammer will have to be determined by the same processing used for a target, so that the timing of the beam scanning modulation can be determined. This modulation is applied to the jamming signal received by the non-scanning beam, and with appropriate scaling for the difference in antenna gains, this signal is subtracted from the one received by the phased array antenna. The resultant signal can now be processed for target detections.

It was previously mentioned that there are three possible modes of operation: (1) use of the same phased array antenna on both transmit and receive; (2) use of a conventional wide-beam non-scanning antenna on transmit combined with the phased array antenna on receive; and (3) use of the phased array antenna on transmit combined with a conventional wide-beam non-scanning antenna on receive. In all cases a nonlinear phase progression is applied to the phased array, which is then scanned (rotated) across the surveillance sector. The resulting modulated return from a target or targets is then processed in the receiver to compress the beam. The disclosure of exemplary embodiments herein has been primarily focused on the second mode, namely use of a conventional wide-beam antenna on transmit combined with the phased array antenna on receive. The first mode, use of the same phased array antenna on both transmit and receive, requires use of a pulsed waveform, with the same progressive nonlinear phasing on both transmit and receive. A variation of this mode could be used with CW-type waveforms, but separate arrays would be needed to isolate the transmit and receive paths. Regardless of the mode or waveform, the correlation process is similar, as it is applied to the time sequence of each of the range-gated outputs in the receiver, after pulse compression, if such waveforms are used. Note that if the same phased array antenna is used on both transmit and receive, the return will be the square of Equation (1), otherwise it would be just Equation (1). This means it has the advantage of the antenna gain on both transmit and receive, for improved detection performance, as well as reduced sidelobe levels, for improved clutter suppression.

An equally preferred embodiment is the second mode, where a conventional wide-beam non-scanning antenna is used on transmit combined with the beam-broadened phase array antenna on receive. The advantage of this mode is that the phased array does not have to accommodate the high transmit power. The disadvantage is that the antenna gain and sidelobe levels apply only to the received signal.

The third mode of operation is not a preferred embodiment because of the high power that would be required on transmit. However these and other variations are still within the scope of the invention. Thus while certain preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. A method of operating a radar system comprising:
providing a multi-element phased array antenna with a beam that is deliberately broadened on both transmit and receive by a nonlinear phase progression across its elements to illuminate an entire search space;
scanning of the broadened beam across the search space in angle to create modulated returns from targets in the search space; and,
processing the received returns to compress the beam in angle and determine the angles of the targets by cross-correlating the returns with a predetermined signal having the same modulation versus time characteristic as a return from a target at a known reference angle.

2. The method of claim 1 wherein the transmitter output is distributed to the phased array elements during the transmit cycle and the outputs of the phased array elements are summed during the receive cycle and connected to a single receiver.

3. The method of claim 1 wherein the phasing of the phased array antenna elements on both transmit and receive is a nonlinear progression selected from the group consisting of quadratic and sinusoidal progressions.

4. The method of claim 1 wherein the phased array antenna with the broadened beam is electronically scanned across the search space on both transmit and receive with a time-varying linear phase progression across the antenna elements, to create modulated returns from targets in the search space.

5. The method of claim 1 wherein the phased array antenna with the broadened beam is mechanically scanned across the search space on both transmit and receive to create modulated returns from targets in the search space.

6. A method of operating a radar system comprising:
providing a non-scanning broad-beam transmit antenna to illuminate an entire search space and a multi-element phased array antenna with a receive beam deliberately broadened by a nonlinear phase progression across the elements to illuminate the same search space;
scanning of the broadened receive beam across the search space in angle to create modulated returns from targets in the search space; and,
processing the received returns to compress the receive beam in angle and determine the angles of the targets by cross-correlating the returns with a predetermined signal having the same modulation versus time characteristic as a return from a target at a known reference angle.

7. The method of claim 6 wherein the transmitter output is connected to the broad-beam non-scanning transmit antenna and the outputs of the phased array elements on receive are summed and connected to a single receiver.

8. The method of claim 6 wherein the phasing of the phased array antenna elements on receive is a nonlinear progression selected from the group consisting of quadratic and sinusoidal progressions.

9. The method of claim 6 wherein the phased array antenna with the broadened beam is electronically scanned across the search space on receive with a time-varying linear phase progression across the antenna elements, to create modulated returns from targets in the search space.

10. The method of claim 6 wherein the phased array antenna with the broadened beam is mechanically scanned across the search space on receive to create modulated returns from targets in the search space.

11. A method of operating a radar system comprising:
providing a multi-element phased array transmit antenna with a transmit beam deliberately broadened by a nonlinear phase progression across the elements to illuminate an entire search space, and a non-scanning broad-beam receive antenna to illuminate the same search space;
scanning of the broadened transmit beam across the search space in angle to create modulated returns from targets in the search space; and,
processing the received returns to compress the transmit beam in angle and determine the angles of the targets by cross-correlating the returns with a predetermined signal having the same modulation versus time characteristic as a return from a target at a known reference angle.

12. The method of claim 11 wherein the transmitter output is distributed to the phased array elements and the output of the broad-beam non-scanning receive antenna is connected to a single receiver.

13. The method of claim 11 wherein the phasing of the phased array antenna elements on transmit is a nonlinear progression selected from the group consisting of quadratic and sinusoidal progressions.

14. The method of claim 11 wherein the phased array antenna with the broadened beam is electronically scanned across the search space on transmit with a time-varying linear phase progression across the antenna elements, to create modulated returns from targets in the search space.

15. The method of claim 11 wherein the phased array antenna with the broadened beam is mechanically scanned across the search space on transmit to create modulated returns from targets in the search space.

16. The method of claim 1, 6 or 12 wherein the beam compression is accomplished by cross-correlating the returns with the predetermined signal to determine the target angle(s) on the basis of the timing of the cross-correlation peak(s).

17. The method of claim 1, 6 or 12 wherein the phased array antenna is constructed in two dimensions on a planar or other surface and an electronic scan is implemented across the search space in two orthogonal planes.

18. The method of claim 1, 6 or 12 wherein the phased array antenna is constructed in two dimensions on a planar or other surface and an electronic scan is implemented across the search space in one plane and a mechanical scan is implemented in the orthogonal plane.

19. The method of claims 1, 6 or 12 wherein the phased array antenna is constructed in two dimensions on a planar or other surface and the elements in each row are summed and connected to separate receivers for each row.

20. The method of claim 1, 6 or 12 wherein range gating is implemented in the receiver or receivers to resolve targets in range before the returns in each range gate are cross-correlated to compress the beam in angle.

21. The method in claim 20 wherein the processing includes range gating using pulse compression techniques.

22. The method of claim 20 wherein the returns in each range gate are further processed to resolve targets in Doppler, and the measured Doppler motion is applied to the cross-correlation process to compress the beam in angle.

23. The method of claim 22 wherein the Doppler resolution is implemented as Fourier transform processing of the returns in each range gate.

24. The method of claim 22 wherein the cross-correlation process in each range gate includes a search for an unknown target Doppler.

25. The method of claim 24 wherein the predetermined reference signal in the cross-correlation process includes a plurality of calculated Doppler shifts to determine both the angle of the target and its Doppler shift.

26. The method of claim 20 wherein keystone processing is used prior to range gating to mitigate target wander in range.

27. The method of claim 1, 6 or 12 wherein the phased array antenna conforms to a geometric shape selected from the group consisting of a line, arc, circle, flat plane, cylinder, cone, and hemisphere.

28. The method of claim 1, 6 or 12 wherein amplitude weighting is applied to the array elements to reduce the compressed pattern sidelobes.

29. The method of claim 1, 6 or 12 wherein beam compression provides long uninterrupted dwells for better tracking and analysis of targets.

30. The method of claim 1, 6 or 12 wherein the residual amplitude modulation after the beam is compressed is removed to facilitate target analysis.

31. The method of claim 1, 6 or 12 wherein a separate non-scanning wide-beam antenna and receiver are used to cancel jamming signals.

32. The method of claims 1, 6, or 12 wherein the nonlinear phase progression across the array antenna is accomplished by physical displacement of the array elements from a nominal array surface.

33. The method of claim 32 wherein the array is mechanically scanned across the search space to create modulated returns from targets for processing to compress the beam.

34. The method of claim 32 wherein the array is electronically scanned across the search space to create modulated returns from targets for processing to compress the beam.

* * * * *